United States Patent
Armbruster et al.

(10) Patent No.: US 9,956,967 B2
(45) Date of Patent: May 1, 2018

(54) METHOD FOR SELECTING MULTIPLE PROGRAM FUNCTIONS, METHOD FOR SELECTING ONE PROGRAM FUNCTION, ASSOCIATED APPARATUSES AND ASSOCIATED VEHICLE, SHIP OR AIRCRAFT

(71) Applicant: Siemens Aktiengesellschaft, Munich (DE)

(72) Inventors: Michael Armbruster, Munich (DE); Andreas Zirkler, Munich (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 12 days.

(21) Appl. No.: 15/119,436

(22) PCT Filed: Dec. 16, 2014

(86) PCT No.: PCT/EP2014/078018
§ 371 (c)(1),
(2) Date: Aug. 17, 2016

(87) PCT Pub. No.: WO2015/124234
PCT Pub. Date: Aug. 27, 2015

(65) Prior Publication Data
US 2017/0015330 A1  Jan. 19, 2017

(30) Foreign Application Priority Data
Feb. 21, 2014  (DE) .................. 10 2014 203 162

(51) Int. Cl.
*B60W 50/00* (2006.01)
*G05B 19/042* (2006.01)
(Continued)

(52) U.S. Cl.
CPC ........ *B60W 50/0098* (2013.01); *B60W 10/18* (2013.01); *B60W 10/20* (2013.01);
(Continued)

(58) Field of Classification Search
CPC .. B60W 50/0098; B60W 10/18; B60W 10/20; G05B 19/0428; G05B 23/0259; G06F 11/202
See application file for complete search history.

(56) References Cited

U.S. PATENT DOCUMENTS

| | | | |
|---|---|---|---|
| 7,099,755 B2 | 8/2006 | Mueller et al. ................. | 701/21 |
| 9,002,480 B2 | 4/2015 | Porsch et al. .................... | 700/3 |
| 2006/0015231 A1* | 1/2006 | Yoshimura ............... | B60K 6/46 |
| | | | 701/48 |

FOREIGN PATENT DOCUMENTS

| | | | | |
|---|---|---|---|---|
| WO | 2004/106153 A1 | 12/2004 | ............ | B63B 49/00 |
| WO | 2013/053643 A2 | 4/2013 | ............ | G06F 11/20 |
| WO | 2015/124234 A1 | 8/2015 | ........... | G05B 19/042 |

OTHER PUBLICATIONS

Armbruster, M. et al., "X-by-Wire Platform Approach: Functionality, Safety, and Design," European Automotive Safety, Frankfurt, 23 pages, May 8, 2007.
(Continued)

*Primary Examiner* — Michael D Lang
(74) *Attorney, Agent, or Firm* — Slayden Grubert Beard PLLC

(57) ABSTRACT

A method is provided for selecting a plurality of program functions for providing repeatedly implemented functions, e.g., in a vehicle, ship or in an aircraft. The method includes determining a first total performance value based on recorded first single performance values and recorded first dependencies, determining a first total performance value based on determined second single performance values and recorded second dependencies, determining a cluster per-
(Continued)

formance from the first total performance value and from the second total performance value, and the cluster performance value or at least one value determined from the cluster performance value is used for selecting the program functions or of other program functions for providing the repeatedly implemented functions.

14 Claims, 16 Drawing Sheets

(51) Int. Cl.
  *G05B 23/02* (2006.01)
  *G06F 11/20* (2006.01)
  *B60W 10/18* (2012.01)
  *B60W 10/20* (2006.01)

(52) U.S. Cl.
  CPC ..... *G05B 19/0428* (2013.01); *G05B 23/0259* (2013.01); *G06F 11/202* (2013.01); *B60W 2050/0004* (2013.01); *B60W 2300/00* (2013.01); *G05B 2219/14104* (2013.01); *G05B 2219/14106* (2013.01); *G05B 2219/24177* (2013.01); *G05B 2219/24182* (2013.01)

(56) References Cited

OTHER PUBLICATIONS

Armbruster, M., "Eine fahrzeugübergreifende X-by-Wire Plattform zur Ausführung umfassender Fahr- und Assistenzfunktionen," Dissertation, Institut für Luftfahrtsysteme der Universität Stuttgart, 229 pages (German language w/ English abstract), Jul. 21, 2009.
Li, X.J. et al., "Model to Evaluation the State of Mechanical Equipment Based on Health Value," Mechanism and Machine Theory, vol. 46, No. 3, pp. 305-311 (7 pages), Dec. 14, 2010.
Reichel, Reinhard, "X-by-Wire Plattform—Concept and Design," AT—Automatisierungstechnik, Bd. 59, No. 9, pp. 583-596, 2011.
German Office Action, Application No. 102014203162.1, 6 pages, dated Oct. 22, 2014.
International Search Report and Written Opinion, Application No. PCT/EP2014/078018, 11 pages, dated Jun. 10, 2015.

* cited by examiner

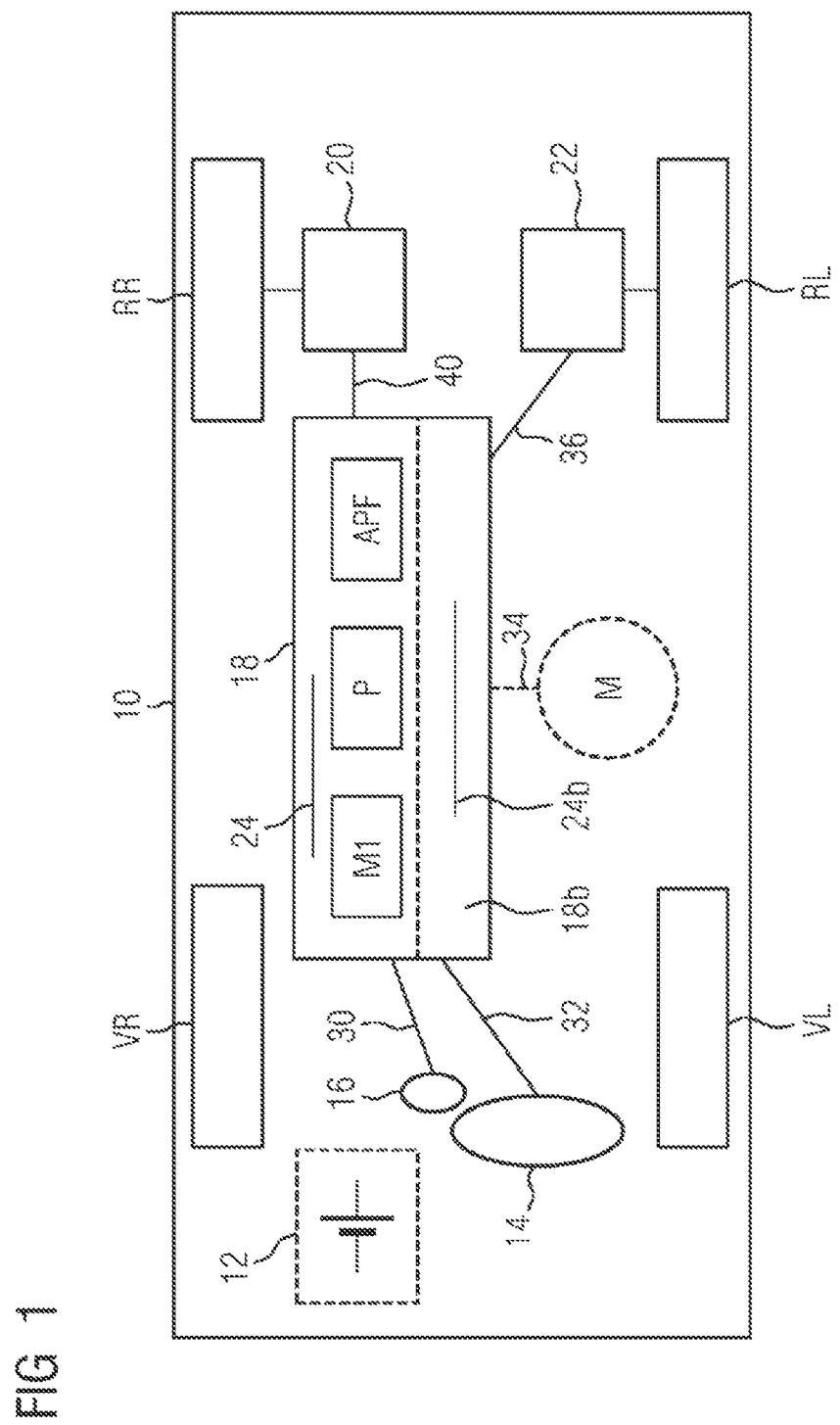

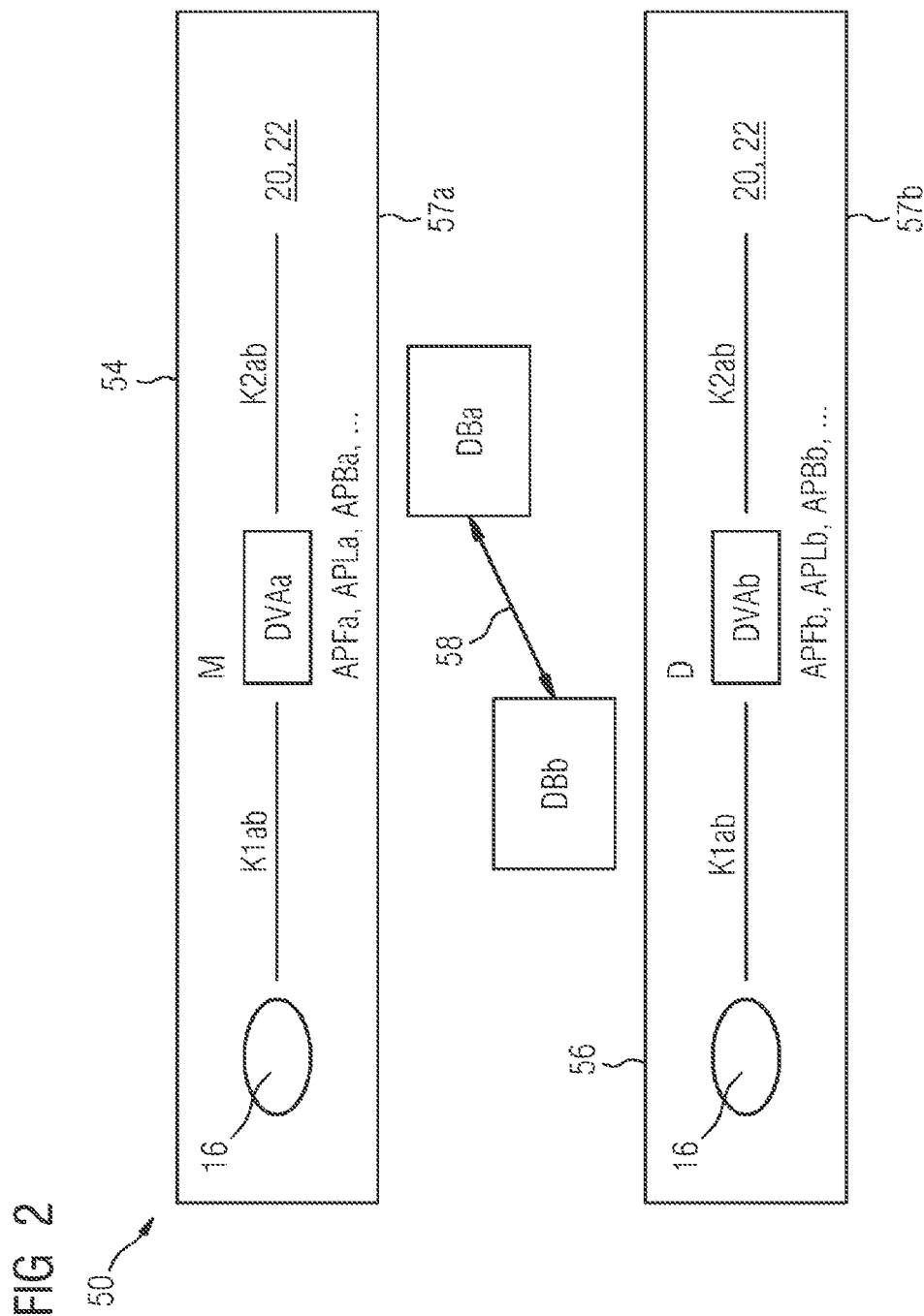

FIG 3

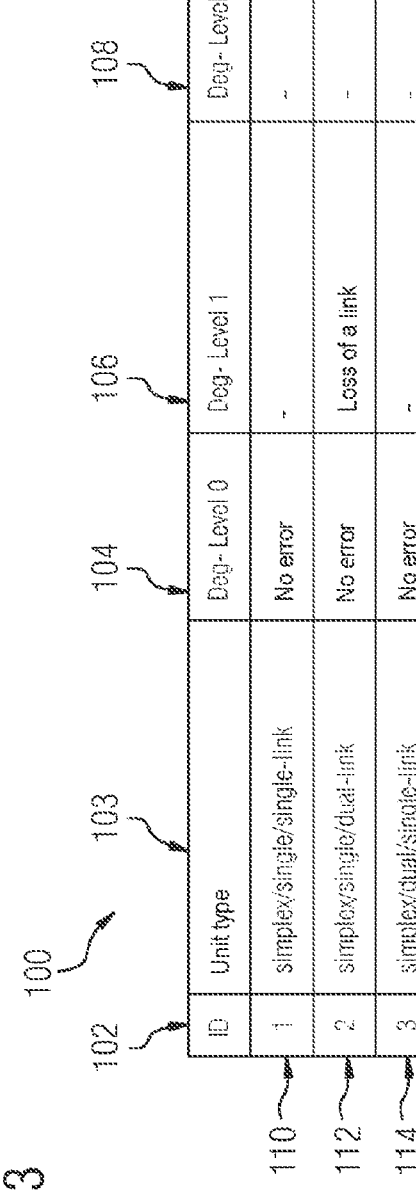

| ID | Unit type | Deg.-Level 0 | Deg.-Level 1 | Deg.-Level 2 |
|---|---|---|---|---|
| 1 | simplex/single/single-link | No error | - | - |
| 2 | simplex/single/dual-link | No error | Loss of a link | - |
| 3 | simplex/dual/single-link | No error | - | - |
| 4 | simplex/dual/dual-link | No error | Loss of a link | - |
| 5 | simplex/dual/dual-single-link | No error | Loss of a sensor pair | - |
| 6 | simplex/dual-dual/dual-link | No error | Loss of a link | Loss of a sensor pair |
| 7 | duplex/duplex/single-link | No error | - | - |
| 8 | duplex/duplex/dual-link | No error | Loss of a link | - |
| 9 | duplex/duo-duplex/single-link | No error | Loss of a sensor pair | - |
| 10 | duplex/duo-duplex/dual-link | No error | Loss of a link | Loss of a sensor pair |
| 11 | simplex/duo-triple/dual-link | tbd | tbd | tbd |

FIG 7

| | Accelerator pedal 16 | | RL wheel 22 | | | RR wheel 20 | | |
|---|---|---|---|---|---|---|---|---|
| p | Deg0 | DegN | Deg0 | Deg1 | DegN | Deg0 | Deg1 | DegN | ... |
| 0 | 0 | 1 | 0 | 0 | 1 | 0 | 0 | 1 | ... |
| 0 | 1 | 0 | 0 | 1 | 1 | 0 | 0 | 1 | ... |
| 0 | 0 | 0 | 1 | 0 | 0 | 0 | 0 | 1 | ... |
| 0 | 1 | 0 | 0 | 0 | 0 | 0 | 0 | 1 | ... |
| 0 | 0 | 0 | 0 | 1 | 1 | 0 | 1 | 0 | ... |
| 0 | 0 | 0 | 1 | 0 | 1 | 0 | 1 | 0 | ... |
| 0 | 1 | 1 | 0 | 0 | 0 | 0 | 1 | 0 | ... |
| 0 | 1 | 0 | 0 | 1 | 0 | 0 | 1 | 0 | ... |
| 0 | 0 | 0 | 0 | 0 | 1 | 1 | 0 | 0 | ... |
| 0 | 1 | 1 | 1 | 0 | 0 | 1 | 0 | 0 | ... |
| 0 | 0 | 0 | 0 | 1 | 0 | 1 | 0 | 0 | ... |
| 0 | 1 | 0 | 0 | 0 | 0 | 1 | 0 | 0 | ... |
| 0 | 1 | 1 | 0 | 0 | 0 | 0 | 0 | 0 | ... |

FIG 8

| | Performance level of an APP(i) | Selection criterion |
|---|---|---|
| 10 | GREEN | All UNITS/APPS(i) with direct dependency on APP(i) are available without degradation |
| 9 | YELLOW1 | not defined |
| 8 | YELLOW2 | not defined |
| 7 | YELLOW3 | One UNIT has reduced availability |
| 6 | YELLOW4 | More than one UNIT have reduced availability |
| 5 | YELLOW5 | At least one UNIT is absent but control quality/functional performance deteriorates in a manner not experienceable by the customer. |
| 4 | YELLOW6 | At least one UNIT is absent and control quality/functional performance deteriorates in a manner experienceable by the customer. |
| 3 | YELLOW7 | As YELLOW6, but APP(i) reports the need for unscheduled servicing (termination of the service assignment, but not of the driving assignment) |
| | | At least one UNIT is absent and control quality/functional performance deteriorates in a manner experienceable by the customer with worse performance than that of performance level YELLOW6. Optionally, APP(i) reports the need for unscheduled servicing (termination of the service assignment, but not of the driving assignment). |
| 2 | YELLOW8 | At least one UNIT is absent and control quality/functional performance deteriorates in a manner experienceable by the customer or APP(i) reports a red warning --> assignment termination is necessary |
| 1 | YELLOW9 | APP(i) is not executable or DL is executed or performance is worse than the performance level YELLOW8. |
| 0 | RED | |

FIG 9

| #define | Decimal value | Deg-Level | simplex/single/single-link | simplex/single/dual-link | simplex/dual/single-link | simplex/dual/dual-link | simplex/dual-single/single-link | simplex/dual-dual/dual-link | duplex/single-link | duplex/dual-link | duplex/single-dup/single-link | duplex/dual-dup/dual-link |
|---|---|---|---|---|---|---|---|---|---|---|---|---|
| PL_GREEN | 0 | 0 | X | X | X | X | X | X | X | X | X | X |
| PL_YELLOW1 | 1 | 1 | - | X | - | X | X | X | - | X | X | X |
| PL_YELLOW2 | 2 | 2 | - | - | - | - | - | X | - | - | - | X |
| PL_YELLOW3 | 3 | 3 | - | - | - | - | - | - | - | - | - | - |
| PL_YELLOW4 | 4 | 4 | - | - | - | - | - | - | - | - | - | - |
| PL_YELLOW5 | 5 | 5 | - | - | - | - | - | - | - | - | - | - |
| PL_YELLOW6 | 6 | 6 | - | - | - | - | - | - | - | - | - | - |
| PL_YELLOW7 | 7 | 7 | - | - | - | - | - | - | - | - | - | - |
| PL_YELLOW8 | 8 | 8 | - | - | - | - | - | - | - | - | - | - |
| PL_YELLOW9 | 9 | 9 | - | - | - | - | - | - | - | - | - | - |
| PL_RED | 10 | N | X | X | X | X | X | X | X | X | X | X |
| | | ID | 1 | 2 | 3 | 4 | 5 | 6 | 7 | 8 | 9 | 10 |

X  Deg-Level is available for this unit type
-  Deg-Level is not available for this unit type

METHOD FOR SELECTING MULTIPLE PROGRAM FUNCTIONS, METHOD FOR SELECTING ONE PROGRAM FUNCTION, ASSOCIATED APPARATUSES AND ASSOCIATED VEHICLE, SHIP OR AIRCRAFT

CROSS-REFERENCE TO RELATED APPLICATIONS

This application is a U.S. National Stage Application of International Application No. PCT/EP2014/078018 filed Dec. 16, 2014, which designates the United States of America, and claims priority to DE Application No. 10 2014 203 162.1 filed Feb. 21, 2014, the contents of which are hereby incorporated by reference in their entirety.

TECHNICAL FIELD

The invention relates inter alia to a method and an apparatus for selecting a program function for providing multiple instances of an implemented function, i.e., a redundantly provided function. There may be single redundancy, i.e. two functions, or multiple redundancy of greater than one. The functions that are redundant in respect of one another can be provided in an identical manner or in a different manner, for example when a redundant function is intended to ensure only one emergency function.

BACKGROUND

Particularly in the context of autonomous driving, redundant systems are of great significance. Autonomous driving comes into consideration for electric vehicles, for internal combustion engine vehicles and for hybrid vehicles. In aviation, autonomous flying has already existed for a relatively long time. However, improvements to redundant systems are still possible in aviation too.

SUMMARY

One embodiment provides a method for selecting multiple program functions for providing multiple instances of an implemented functions, thereby providing a redundantly implemented function, e.g., in a vehicle, ship or in an aircraft, wherein first dependencies are or have been recorded between single performance values for functional units that are used for performing a first program function and total performance values that have been stipulated for redundantly implemented functions, wherein second dependencies are or have been recorded between single performance values for functional units that are used for performing a second program function and the stipulated total performance values, wherein current first single performance values of the functional units of the first program function are ascertained, wherein current second single performance values of the functional units of the second program function are ascertained, wherein the ascertained first single performance values and the recorded first dependencies are used to ascertain or to compute a first total performance value, wherein the ascertained second single performance values and the recorded second dependencies are used to ascertain or to compute a second total performance value, wherein a cluster performance value is ascertained from the first total performance value and from the second total performance value, and wherein the cluster performance value or at least one value ascertained or computed therefrom is used for selecting the program functions or other program functions for providing the redundantly implemented functions.

Another embodiment provides a method for selecting a program function for providing multiple instances of an implemented functions, thereby providing a redundantly implemented function, e.g., in a vehicle, ship or in an aircraft, wherein dependencies are or have been recorded between single performance values for functional units that are used for performing the program function and total performance values that have been stipulated for a redundantly implemented function, wherein current single performance values of the functional units are ascertained, wherein the ascertained single performance values and the recorded dependencies are used to ascertain or to compute a total performance value for the functional units, and wherein the total performance value or at least one value ascertained or computed therefrom is used for selecting the program function or another program function for providing the redundantly implemented function.

In one embodiment, the dependencies are recorded in a matrix, wherein preferably the rows of the matrix are associated with the total performance values and the columns of the matrix are associated with the single performance values, or wherein preferably the columns of the matrix are associated with the total performance values and the rows of the matrix are associated with the single performance values, wherein the matrix preferably contains only two different values, particularly the values 0 and 1, wherein preferably at least two rows of the matrix or at least two columns of the matrix are provided for at least one total performance value, e.g., to represent OR functions and/or in order to take account of states of functional units that are crucial for the relevant total performance value.

In one embodiment, multiple classes of functional units are stipulated whose single performance values have a class-specific significance, and wherein preferably at least two functional units of the function belong to the same class, and/or wherein preferably at least two functional units of the function belong to different classes, wherein the classes are stipulated or have been stipulated preferably on the basis of at least one, at least two or on the basis of all of the following redundancy features: no redundancy for a functional unit or redundancy by virtue of redundantly provided functional units, no value redundancy or value redundancy with respect to a functional unit, and no communication redundancy, particularly communication link redundancy, or multiple communication redundancy.

In one embodiment, the total performance values are stipulated or have been stipulated for multiple or for all functional units in equal measure, particularly taking account of the effect of an error in terms of the negative impact on passengers and/or freight, and/or the shortfall below a service assignment or a service interval, and/or the termination of a journey or a driving assignment or a flight.

In one embodiment, the current single performance values are recorded in a matrix or in a vector, wherein preferably this matrix or this vector contains only two different values, e.g., the values 0 and 1.

In one embodiment, the total performance value is ascertained by multiplying the two matrices or by multiplying the matrix and the vector.

In one embodiment, the total performance value is ascertained by using a computation function that is defined for values less than or not equal to the number of functional units to form a first value, particularly to form 0, and that is defined for a value equal to this number to form a second value, which differs from the first value, particularly the value 1.

In one embodiment, ascertainment of the total performance value involves the use of a vector in which the total performance values are recorded in accordance with the recorded dependencies, wherein preferably this vector and a vector or a matrix that has been ascertained using the computation function are multiplied, and/or wherein the method is performed cyclically, preferably with a cycle time of less than 50 milliseconds.

In one embodiment, at least one functional unit is a network node, and/or wherein at least one functional unit is the program function itself, wherein particularly a function for driving is provided, wherein preferably the function for driving contains at least one of the following functional units, a function relating to an accelerator pedal, at least one or at least two or at least four functions relating to a wheel that preferably each contain a function relating to a drive motor, a program relating to driving, wherein particularly a function for braking is provided, wherein preferably the function for braking contains at least one of the following functional units, a unit for reading the driver braking requirement at the brake pedal, a unit for actuating the brake hydraulics, e.g., at least two units, electrically driven wheel, that are also able to be used for braking, a program function having the task of converting the brake command required by the driver into a setpoint braking specification for the wheel, preferably at the rear right or preferably at the rear left, and the network node for actuating the hydraulic brake, wherein particularly a function for steering is provided, wherein preferably the function for steering contains at least one of the following functional units, actuation of a steering controller and output of the actual steering position, evaluation of the setpoint steering angle at the steering wheel, program function controller specification=f (actual steering angle, setpoint steering angle), wherein particularly a function for an assistance function is provided, particularly for an ABS, for an ESP or for fully automatic driving.

In one embodiment, cluster performance values are stipulated or have been stipulated for multiple or for all functions in equal measure, wherein preferably at least one, at least two or all of the following classes are taken into account: most important function or most important functions, second most important function or second most important functions, less important function or less important functions, particularly taking account of the effect of an error in terms of the negative impact on passengers and/or freight, and/or the shortfall below a service assignment or a service interval, and/or the termination of a journey or a driving assignment or a flight.

In one embodiment, a cluster performance value is ascertained for multiple functions of a cluster, particularly by means of queries, preferably by means of IF THEN queries or by means of CASE queries.

Another embodiment provides an apparatus, particularly for performing a method as disclosed above, having a memory unit in which first dependencies are or have been recorded between single performance values for functional units that are used for performing a first program function and total performance values that have been stipulated for redundantly implemented functions, e.g., where multiple instances of a function are implemented, and in which second dependencies are or have been recorded between single performance values for functional units that are used for performing a second program function and the stipulated total performance values, having an ascertainment unit that ascertains current first single performance values of the functional units of the first program function and that ascertains current second single performance values of the functional units of the second program function, having a second ascertainment unit the ascertained first single performance values and the recorded first dependencies to ascertain or to compute a first total performance value the ascertained second single performance values and the recorded second dependencies to ascertain or to compute a second total performance value, and having a third ascertainment unit that ascertains a cluster performance value from the first total performance value and from the second total performance value, and having a selection unit that uses the cluster performance value or at least one value ascertained or computed therefrom for selecting the first program function and the second program function or other program functions for providing the redundantly implemented functions.

Another embodiment provides an apparatus, e.g., for performing a method as disclosed above, the apparatus having a memory unit in which dependencies are or have been recorded between single performance values for functional units that are used for performing a program function and total performance values that have been stipulated for redundantly implemented functions, e.g., where multiple instances of a function are implemented, having an ascertainment unit that ascertains current single performance values of the functional units, having a further ascertainment unit or computation unit that uses the ascertained single performance values and the recorded dependencies to ascertain or to compute a total performance value, and having a selection unit that uses the current total performance value or at least one value ascertained or computed therefrom for selecting the program function or another program function for providing the redundantly implemented function.

Another embodiment provides a vehicle, ship or aircraft having such an apparatus.

BRIEF DESCRIPTION OF THE DRAWINGS

Example aspects and embodiments of the invention are explained below with reference to the drawings, in which:

FIG. 1 shows functional units or units in an automobile,

FIG. 2 shows two reciprocally redundant applications comprising functional units for the "driving" application, FIG. 3 shows the stipulated classes for the performance or effectiveness of units or network nodes, FIG. 7 shows a detail from the dependency matrix A based on the third design level, FIG. 8 shows the stipulation of performance level for multiple applications that each contain multiple units or network nodes, FIG. 9 shows an association between the decimal value of the "degradationlevel" variable and the associated degradation level and also for the classes of units or network nodes.

DETAILED DESCRIPTION

Figure 4:
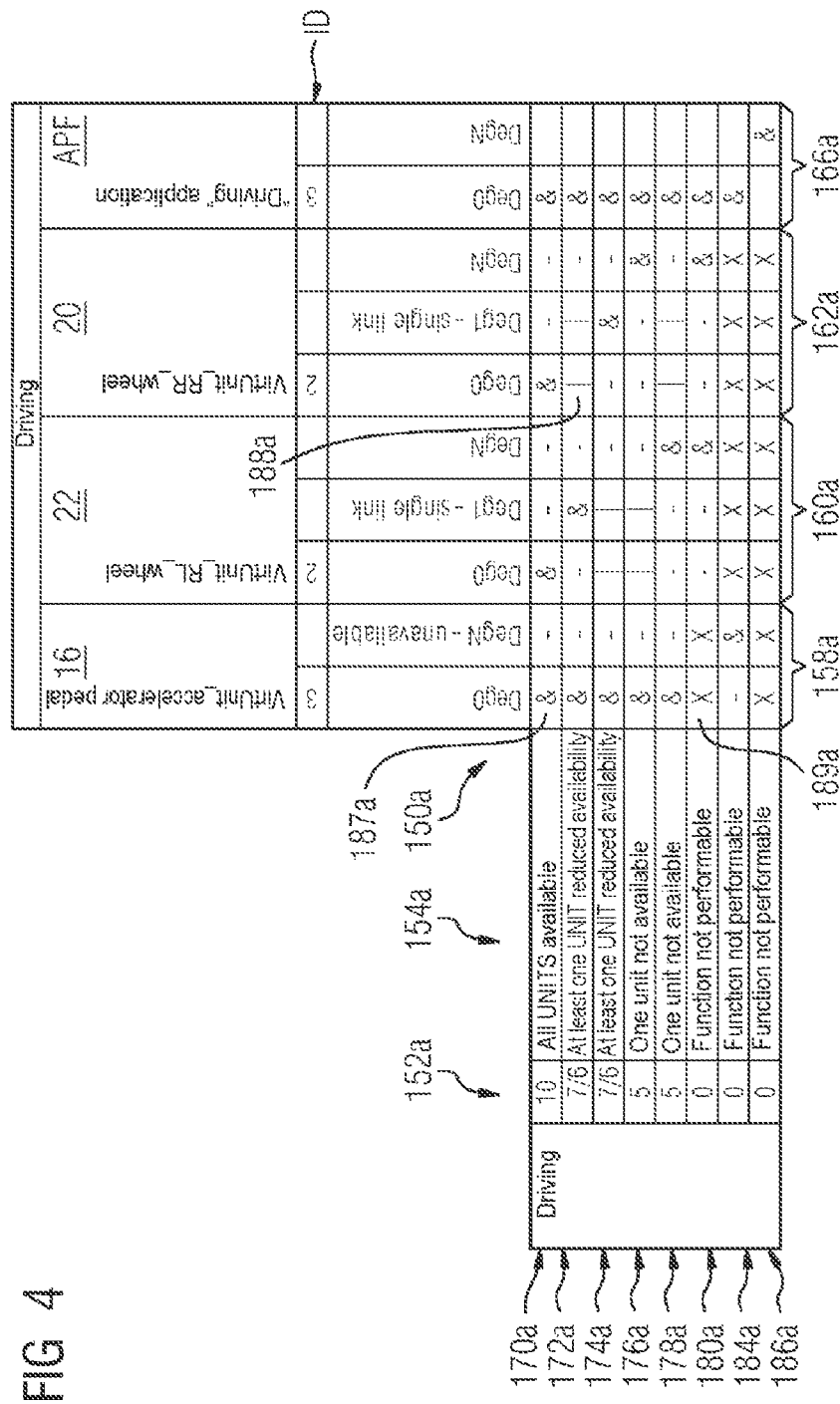
FIG. 4 shows a dependency matrix A based on a first design level.

Some embodiments provide a method for selecting multiple program functions for providing multiple instances of an implemented function, thereby providing a redundantly implemented function, e.g., in a vehicle, ship or in an aircraft:
wherein first dependencies are or have been recorded between single performance values for functional units that are used for performing a first program function and total performance values that have been stipulated for redundantly implemented functions,
wherein second dependencies are or have been recorded between single performance values for functional units that are used for performing a second program function and the stipulated total performance values,
wherein current first single performance values of the functional units of the first program function are ascertained,
wherein current second single performance values of the functional units of the second program function are ascertained,
wherein the ascertained first single performance values and the recorded first dependencies are used to ascertain or to compute a first total performance value,
wherein the ascertained second single performance values and the recorded second dependencies are used to ascertain or to compute a second total performance value,
wherein a cluster performance value is ascertained from the first total performance value and from the second total performance value,
and wherein the cluster performance value or at least one value ascertained or computed therefrom is used for selecting the program functions or other program functions for providing the redundantly implemented functions.

Some embodiments provide a method for selecting a program function for providing a redundantly implemented function, particularly in a vehicle, ship or in an aircraft,
wherein dependencies are or have been recorded between single performance values for functional units (unit/network node) that are used for performing the program function and total performance values that have been stipulated for a redundantly implemented function,
wherein current single performance values of the functional units are ascertained,
wherein the ascertained single performance values and the recorded dependencies are used to ascertain or to compute a total performance value,
and wherein the total performance value or at least one value ascertained or computed therefrom is used for selecting the program function or another program function for providing the redundantly implemented function.

An apparatus that is suitable particularly for performing a method as cited above can contain:
a memory unit in which first dependencies are or have been recorded between single performance values for functional units that are used for performing a first program function and total performance values that have been stipulated for redundantly implemented functions,
and in which second dependencies are or have been recorded between single performance values for functional units that are used for performing a second program function and the stipulated total performance values,
an ascertainment unit that ascertains current first single performance values of the functional units of the first program function and that ascertains current second single performance values of the functional units of the second program function,
a second ascertainment unit that uses the ascertained first single performance values and the recorded first dependencies to ascertain or to compute a first total performance value and that uses the ascertained second single performance values and the recorded second dependencies to ascertain or to compute a second total performance value,
a third ascertainment unit that ascertains a cluster performance value from the first total performance value and from the second total performance value, and
a selection unit that uses the cluster performance value or at least one value ascertained or computed therefrom for selecting the first program function and the second program function or other program functions for providing the redundantly implemented functions.

Some embodiments provide an apparatus, particularly for performing the method cited above,
having a memory unit in which dependencies are or have been recorded between single performance values for functional units (unit/network node) that are used for performing a program function and total performance values that have been stipulated for a redundantly implemented function,
having an ascertainment unit that ascertains current single performance values,
having a further ascertainment unit or computation unit that uses the ascertained single performance values and the recorded dependencies to ascertain or to compute a total performance value,
and having a selection unit that uses the current total performance value or at least one value ascertained or computed therefrom for selecting the program function or another program function for providing the redundantly implemented function.

Some embodiments provide a vehicle, a ship or an aircraft having one of the aforementioned apparatuses.

Thus, some embodiments provide simple methods for selecting multiple program functions for providing redundantly implemented functions and a method for selecting one program function for providing a redundantly implemented function that are able to be extended particularly in a simple manner. Furthermore, the aim is to specify associated apparatuses and associated vehicles, ships or aircraft.

Some embodiments provide a method for selecting multiple program functions for providing redundantly implemented functions, particularly in a vehicle, ship or in an aircraft:
wherein first dependencies are or have been recorded between single performance values for functional units that are used for performing a first program function, which is subsequently also referred to as functional units of the program function or of the function, and total performance values that have been stipulated for redundantly implemented functions, wherein second dependencies are or have been recorded between single performance values for functional units that are used for performing a second program function and the stipulated total performance values, wherein current first single performance values of the functional units of the first program function are ascertained, wherein current second single performance values of the functional units of the second program function are ascertained, wherein the ascertained first single performance values and the recorded first dependencies are used to ascertain or to compute a first total performance value, wherein the ascertained second single performance values and the recorded second dependencies are used to ascertain or to compute a second total performance value, wherein a cluster performance value is ascertained from the first total performance value and from the second total performance value, and wherein the cluster performance value or at least one value ascertained or computed therefrom is used for selecting the program functions or other program functions for providing the redundantly implemented functions.

The cluster therefore contains multiple functions. In contrast to performance of the method without clustering, clustering results in the computation complexity being significantly lowered and hence computation time being saved. This allows the method to be performed cyclically within a time of shorter than 50 ms, even if said method relates to multiple functions.

In an alternative method for selecting one program function for providing a redundantly implemented function, i.e., wherein multiple instances of a function are implemented, e.g., in a vehicle, ship or in an aircraft, it is possible for:

dependencies to be recorded or to have been recorded between single performance values for functional units (unit/network node) that are used for performing the program function and total performance values that have been stipulated for the redundantly implemented function, current single performance values of the functional units (of the function or of the program function) to be ascertained, the ascertained single performance values and the recorded dependencies to be used to ascertain or to compute a total performance value for the functional units (of the function or of the program function), and the total performance value or at least one value ascertained or computed therefrom to be able to be used for selecting the program function or the function or for selecting another program function or another function for providing the redundantly implemented function.

Hence, the method can also be performed without clustering, for example.

The redundantly implemented function is accordingly provided on a redundant basis in both alternatives. The dependencies can be recorded in a matrix or in another manner.

The total performance value can be referred to as y and is preferably a scalar quantity, which is particularly suitable for a simple comparison with other scalar quantities.

The cited steps can thus provide a particularly simple way of ascertaining a total performance value that allows the selection of currently preferably used functional units in a master/servant or master/slave control or feedback control system, particularly on the basis of objective criteria. In particular, a multiplicity of different criteria can be taken into account for the selection. Indirectly, it is therefore possible to put aside such units as are adversely affected or degraded to a greater extent than other units, for example on account of brief or continuous faults.

The program function can contain commands that are executed by a processor of a first data processing system. The program function is also defined by being a unit to which a master/slave function can be applied, for example either on its own or together with other program functions.

The dependencies can be recorded in a matrix. Thus, the rows of the matrix can be associated with the total performance values and the columns of the matrix can be associated with the single performance values. Alternatively, the columns of the matrix can be associated or may have been associated with the total performance values and the rows of the matrix can be associated or may have been associated with the single performance values. A matrix arrangement is a very clear form of presentation. Furthermore, computation with matrices can be implemented in a simple manner, e.g. in a microprocessor, a microcontroller or a computation unit that does not contain a processor or controller that executes program commands of a program.

By way of example, the matrix can contain just two different values, particularly the values 0 and 1, which further simplifies and speeds up the computation.

For at least one total performance value, there may be at least two rows of the matrix or at least two columns of the matrix provided. It is thus possible to present OR functions in a simple manner in multiple rows. Alternatively or additionally, it is also possible to take account of states of functional units that are crucial for the relevant total performance value, i.e. particularly permutations of state values for functional units of this kind.

It is possible to stipulate multiple classes of functional units whose single performance values have a class-specific significance. At least two functional units of the function can belong to the same class. Alternatively or additionally, at least two functional units of the function can belong to different classes.

The classes can be stipulated or may have been stipulated on the basis of at least one, at least two or on the basis of all of the following redundancy features:

no redundancy for a functional unit or redundancy by virtue of redundantly provided functional units, i.e. there is only the one functional unit for this function, no value redundancy or value redundancy with respect to a functional unit, for example the values are ascertained repeatedly and are also transmitted repeatedly and/or multiple reciprocally redundant sensors are used, no communication redundancy, particularly communication link redundancy, or multiple communication redundancy, particularly communication link redundancy.

Communication redundancy can exist when there are multiple transmission links, duplicated transmission packets or messages.

This type of stipulation of the classes particularly provides for simple extendability of the system. New functional units can be classified into already stipulated classes. This allows the function/application to be extended subsequently by functional units (unit/network node), for example using plug and play approaches, that is to say by simply plugging in. It is also possible for a class to have already been stipulated on the basis of an existing classification system before functional units that belong in this class are added to the function.

The total performance values for the function can be stipulated or may have been stipulated for multiple or for all functional units in equal measure. It is possible for at least one of the following criteria to be taken into account:
the effect of an error in terms of the negative impact on passengers and/or freight,
the shortfall below a service assignment or a service interval, and
the termination of a journey or a driving assignment or a flight.

Hence, criteria are taken into account that are of great significance for the use of the means of transport and hence also provide a good account of the operability of the functional units. A service assignment can amount to more than 50 000 kilometers, for example, in the case of a vehicle.

A driving assignment can amount to more than 4 h, for example, in the case of a vehicle.

This type of stipulation of the total performance values again provides for simple extendability of the system, in particular. Freshly developed functional units can be added to the function subsequently or used by the program function subsequently, for example using plug and play approaches, that is to say by simply plugging in, the total performance values stipulated earlier also applying for these functional units. This also applies for the upgrading of functional units in means of transport.

The current single performance values can be recorded in a matrix or in a vector. This means that there is again a clear form of recording for a multiplicity of values. The matrix or the vector is also particularly suitable for fast computation of a current total performance value. The matrix or the vector can contain only two different values, particularly the values 0 and 1. This allows computation operations with the matrix or with the vector to be speeded up further.

The total performance value can be ascertained by multiplying the two matrices, i.e. dependency matrix and single performance value matrix, or by multiplying the matrix, i.e. the dependency matrix, and the vector by the single performance values. Depending on the order of the multiplication, multiplication can involve the use of the transpose of the dependency matrix or the transpose of the single performance value matrix or the transposed vector, for example. Transposing means that the elements in a matrix have their current row and column interchanged. The matrix multiplication (including vector multiplication) can be implemented for larger matrices than there are functional units present, in order to ensure simple extendability of the system.

The current total performance value can be ascertained by using a computation function that is defined for values less than or not equal to the number of functional units of the function or of the program function to form a first value, particularly to form 0, and that is defined for a value equal to this number to form a second value, which differs from the first value, particularly the value 1. The function may be e.g. a step function shifted on the x axis, said function possibly also being able to be referred to as a shifted sigmoid function. Values greater than the number of functional units in the function may not appear, for example, which means that these values also do not have to be defined. The use of a computation function of this kind allows values that have arisen during matrix multiplication and that are smaller than the number of functional units in the function to be attributed to the value 1 or 0 again. Values that correspond to the number of functional units in the function are set to the value 1, for example. This allows simple ascertainment of a scalar total performance value, for example if the value scale is multiplied by a vector that contains the value 1 only in one element.

Hence, ascertainment of the total performance value can involve the use of a vector in which the total performance values are recorded in accordance with the recorded dependencies. Preferably, this vector and a vector or matrix that has been ascertained by applying the computation function indicated above are multiplied.

A mathematically closed representation is produced that facilitates technical certification, in particular.

The method can be performed cyclically on the basis of both alternatives, preferably with a cycle time of less than 50 milliseconds.

At least one functional unit may be a network node, particularly:
a steering control unit having control electronics, or
a wheel hub motor, if need be with an inverter and/or control electronics, or
a network node having the task of reading and transmitting the accelerator pedal value,
a network node having a drive motor on the wheel at the rear right, analogously at the rear left or at another location, or
a program function having the task of taking the accelerator pedal sensor value and ascertaining a setpoint specification for actuating the driven wheels at the rear right and left or at another location.

The network node may be part of a data transmission network, particularly of a data transmission network that transmits data packets, e.g. LAN (local area network)/ Ethernet or WLAN (wireless LAN).

At least one functional unit may be implemented by the program function itself, for example a program for the "driving" function. At the level of the functional units, the program function is considered, by way of example, only with respect to whether it can deliver data (running) or is not performable (isolated), there being particularly no consideration given to whether or not the data are correct.

A function for "driving" a vehicle may be provided. The function for driving can contain at least one of the following functional units:
a function relating to an accelerator pedal,
at least one, at least two or at least four function(s) relating to a wheel that particularly each contain a function relating to a drive motor,
a program relating to driving.

There may alternatively or additionally be a function for braking provided. The function for braking can contain at least one of the following functional units:
a unit for reading the driver braking requirement at the brake pedal,
a unit for actuating the brake hydraulics,
preferably at least two units, electrically driven wheel e.g. at the rear right and left, that are also able to be used for braking,
a program function having the task of converting the braking command required by the driver into a setpoint braking specification for the wheel e.g. at the rear right, rear left and the network node for actuating the hydraulic brake.

Alternatively or additionally, a function for steering may be provided. The function for steering can contain at least one of the following functional units:
actuation of a steering controller and output of the actual steering position,
evaluation of the setpoint steering angle at the steering wheel,
program function controller specification=f (actual steering angle, setpoint steering angle).

A function for an assistance function can relate to an ABS (antilock braking system), an ESP (electronic stability system) or fully automatic driving. There may be one, two or all of the cited assistance functions available.

Similarly, in the case of an aircraft, there may be functions for the following processes: taxiing, takeoff, getting airborne, climbing, cruising, descent, approach, landing, taxiing to a standstill.

Cluster performance values can be stipulated or may have been stipulated for a multiple or all functions in equal measure. Such a measure also allows simple extendability at the level of the functions and/or great flexibility for system design.

Preferably, at least one, at least two or all of the following classes can be taken into account:
most important function or most important functions,
second most important function or second most important functions,
less important function or less important functions.

This simple categorization allows weighting of the functions according to their significance for the overall system and/or, by way of example, according to the significance for the health of people or for the risk to material assets that are to be transported.

As also with regard to the total performance values for multiple functional units or for an application/function/program function, for example, reference can be made to at least one, at least two or to all of the following criteria in the case of the cluster performance values:
the effect of an error in terms of the negative impact on passengers and/or freight,
the shortfall below a service assignment or a service interval,
the termination of a journey or a driving assignment or a flight.

Stipulation in the same manner (generically), i.e. for multiple functions, ensures simple addition of further functions to the system in this case too.

The cluster performance value for multiple functions or program functions of a cluster can be ascertained by means of queries, for example, particularly by means of IF THEN queries or by means of CASE queries (case dependency). Such queries are present in many common programming languages. The use of clusters can save valuable computation time in realtime applications. It is also possible to use what is known as a WORST ( ) function, which involves the currently worst performance value being ascertained.

An apparatus that is suitable particularly for performing a method as cited above can contain:
a memory unit in which first dependencies are or have been recorded between single performance values for functional units that are used for performing a first program function and total performance values that have been stipulated for redundantly implemented functions,
and in which second dependencies are or have been recorded between single performance values for functional units that are used for performing a second program function and the stipulated total performance values,
an ascertainment unit that ascertains current first single performance values of the functional units of the first program function and that ascertains current second single performance values of the functional units of the second program function,
a second ascertainment unit that uses the ascertained first single performance values and the recorded first dependencies to ascertain or to compute a first total performance value and that uses the ascertained second single performance values and the recorded second dependencies to ascertain or to compute a second total performance value,
a third ascertainment unit that ascertains a cluster performance value from the first total performance value and from the second total performance value, and
a selection unit that uses the cluster performance value or at least one value ascertained or computed therefrom for selecting the first program function and the second program function or other program functions for providing the redundantly implemented functions.

The cluster performance value for multiple or for all functions or at least one value computed therefrom can be used for selecting the program functions of the cluster or other program functions of another cluster for providing the redundantly implemented functions, i.e. for master/slave changeover or activation of a cluster of redundant design on account of better performance.

Hence, the technical effects indicated above for the methods also apply for the apparatus and relevant developments thereof. In particular, clustering achieves a saving of computation time.

An apparatus that is suitable particularly for performing a method as explained above can contain the following:
a memory unit in which dependencies are or have been recorded between single performance values for functional units that are used for performing a program function and total performance values that have been stipulated for a redundantly implemented function,
an ascertainment unit that ascertains current single performance values of the functional units (of the function or of the program function),
a further ascertainment unit or computation unit that uses the ascertained single performance values and the recorded dependencies to ascertain or to compute a, in particular current, total performance value (for the function or for the program function),
and a selection unit that uses the current total performance value or at least one value ascertained or computed therefrom for selecting the program function or for selecting another program function for providing the redundantly implemented function.

Hence, the technical effects indicated above for the methods also apply for the apparatus and relevant developments thereof.

Moreover, a vehicle, a ship or an aircraft can be equipped with such an apparatus. The technical effects indicated above apply analogously. Redundancies and associated methods for ascertaining the effectiveness of or the negative impact on functional units become important particularly for autonomous control of these means of transport, because the technical complexity is then justified in order to minimize risks to people and to freight.

The vehicle may be an electric vehicle, an internal combustion engine vehicle or hybrid vehicle from these two drive forms. It may be an automobile for carrying people, a bus, a truck or another commercial vehicle. Besides vehicle and aircraft, the apparatus may also be contained in a boat or ship, however.

In other words, a method for rating function qualities is specified. A basic problem of error-tolerant systems is that of ensuring unambiguity in the actuation of the actuators or of the actuator system despite the presence of redundancies in a distributed network.

The basis may be a two-channel or more than two-channel error-tolerant control system. A master/slave (servant) attribution for a channel is used to produce the unambiguity addressed above.

The master/slave method selects one of the two channels that are present unambiguously as a master. Only the master channel controls the actuator system, and the unambiguous actuation of said actuator system is then ensured therefor.

The basis of the master/slave method may be a metric for rating and comparing the performance of each channel among one another. The description relates inter alia to a metric and a method for determining just such a functional performance. The metric proposed may be a functionally independent rating scale from 0 to 9 or 0 to 10, for example. This scale can be extended and restricted as desired, this changing nothing about the methods for computing the functional performance of a channel, however.

The method can include a set of transfer functions having the following tasks:
1) Transfer of error indications for sensor system/actuator system to a generic, functionally unspecific degradation level, i.e. single performance values.
2) Transfer of the functionally unspecific degradation levels of the sensor system/actuator system to a performance level for all signal functions of a channel, to one performance level each, on the basis of a dependency matrix, i.e. total performance value (values).
3) Optionally when using clusters: transfer of the performance levels of the single functions of a channel to a cluster performance level for the channel.

The aim of the method may ultimately be to determine the cluster performance level or the total performance level of a channel and to pass it to the master/slave mechanism.

Master/slave methods have been known for a long time. Primary and secondary flight control systems of aircraft, in particular, are an intensive area of application.

There are likewise examples of the use of a master/slave method in the automobile domain:
[1] Armbruster, Lehmann, Reichel, Zimmer, Tjaden, Ostertag, Werner: X-by-Wire platform design-approach: Functionality, Safety and Design. In: European Automotive Safety, Frankfurt, 2007.
[2] Michael Armbruster: Eine fahrzeugübergreifende X-by-Wire Plattform zur Ausführung umfassender Fahr- and Assistenzfunktionen [A cross-vehicle X-by-Wire platform for performing comprehensive driving and assistance functions], Institut für Luftfahrtsysteme der Universität Stuttgart 2009, thesis.

[1] demonstrates the principle of the priority-based master/slave mechanism but no functionally unspecific or no generic methods for determining these very priorities.

Since the master/slave method itself is not highly complex, it is assumed that the methods for determining the performance of a channel are known in principle to the relevant system suppliers, but therein lies the trick of the mechanism, and therefore these methods are not published. By abstracting the rating of a functional performance, for example, the method presented here delineates itself from the actual function, regardless of whether at the level:
 of the network nodes, e.g. steering electronics, brake electronics, video controller,
 of the single functions, e.g. steering, driving, braking, etc., or
 of the function clusters, one function cluster being able to comprise multiple single functions. This allows the master/slave method to be applied to a cluster of functions instead of to a single function. This ultimately reduces computation complexity. The method can also be applied to a single function, however.

By way of example, such an approach may be necessary in order to start using computation of the relevant performance levels as part of extendable systems, e.g. keyword: safe Plug'n'Play.

As illustrated above, the method may include a set of transfer functions having the following tasks:
 Step 1: Transfer of error indications for sensor system/actuator system to a generic, functionally unspecific degradation level.
 Step 2: Transfer of the functionally unspecific degradation levels of the sensor system/actuator system to a performance level for all single functions of a channel, to one performance level each, on the basis of a dependency matrix.
 Step 3 (optional): Transfer of the performance levels of the single functions of a channel to a total performance level for the channel.

The steps are defined in more precise detail below.
Step 1: Generic, Functionally Unspecific Degradation Levels of Units/Network Nodes.

The error recognition is based on known standard error recognition mechanisms, for example, that are applied to the input data stream. Examples of central possible error indicators are:
 no data received,
 incorrect CRC (cyclic redundancy code),
 values not in the value range,
 no match for redundant data,
 implausible data, e.g. identified on the basis of a comparison with a model, for example.

FIG. 3 uses a table 1 to show the categorization of the network nodes into hitherto 11 types, for example. FIG. 3 shows the performance abstraction of units/network nodes or functional units. Each type can have a well-defined set of degradation levels that are taken into account in the subsequent performance computations as appropriate. It is also possible for more or fewer than 11 degradation levels to be used. The crucial factor here is not the number of classes but rather the class formation (in this case 11) itself and the limited number of degradation levels per class.

For the unit type, the following distinctions are made, for example in the order below:
 self-contained redundancy,
 value redundancy, and
 communication link redundancy.

Thus, "simplex/single/single-link" means that the relevant unit or the relevant functional unit is not of redundant design, that there is no value redundancy and that there is a single communication link, i.e. likewise no redundancy.

There is no difference, for example, between application and function, but function and program function can differ in that the function is distributed over the means of transport (vehicle) and the program function is implemented in a controller, e.g. ECU (electronic control unit), e.g. as a software program or as a circuit without a processor that executes a program.

Cluster is a logical abstraction level.

An application is executed on a network node. A unit is a network node. In this case, performance levels are computed via program functions that are executed redundantly on different network nodes, obtain data from other network nodes and send data to yet other network nodes.

Step 2: Performance Levels of Single Functions.

Task: The performance level of the application software components steering, braking and driving can be computed on the basis of the degradation levels of the units. A unit can be unambiguously associated with one type from the preceding section. On this basis, a specific set of well defined degradation levels can thus be obtained for each unit.

The aim may ultimately be to describe the combination between the performance level of an application software component and the degradation levels of units compactly, systematically and in a manner comprehensible to machines. In a further abstraction, the performance levels of multiple application SW (software) components can be combined to form a cluster performance value. This indirection is optional, however, and ultimately allows joint master/slave changeover for multiple application SW components as a group, for example in order to save valuable computation time.

The text below illustrates an approach to how this can be described using matrices. In this regard, we define the following: $\vec{p}$: what is known as performance vector $\vec{X}$: degradation matrix $\vec{A}$: dependency matrix $\vec{K}$: correction matrix $\vec{e}$: identity vector y: performance level of the application under consideration In the correlation, the following holds:

$$y=\vec{p}^{T}*\text{sgn}^{AppMa}[\vec{X}*\vec{A}^{T})-\vec{K})*\vec{e}] \quad \text{Formula (1)}$$

where sgnAppMa is the function explained with reference to FIG. 14.

In the example, this correlation will be explained below.

Step a) Setup of Dependency Matrix A

First of all, for the driving function, for example, table 2 shown in FIG. 4 applies. The symbols used therein have the following meaning of Boolean expressions:

"–" no influence, i.e. the relevant value is ignored at these locations,

"&" AND function, and

"|" OR function.

In step a), this matrix is defined even more precisely until the configuration field shown in FIG. 4 (table 2) contains only & dependencies. This can lead to the matrix shown in FIG. 5 (table 3). It is thus possible for all permutations to be explicitly noted down.

Figure 6:
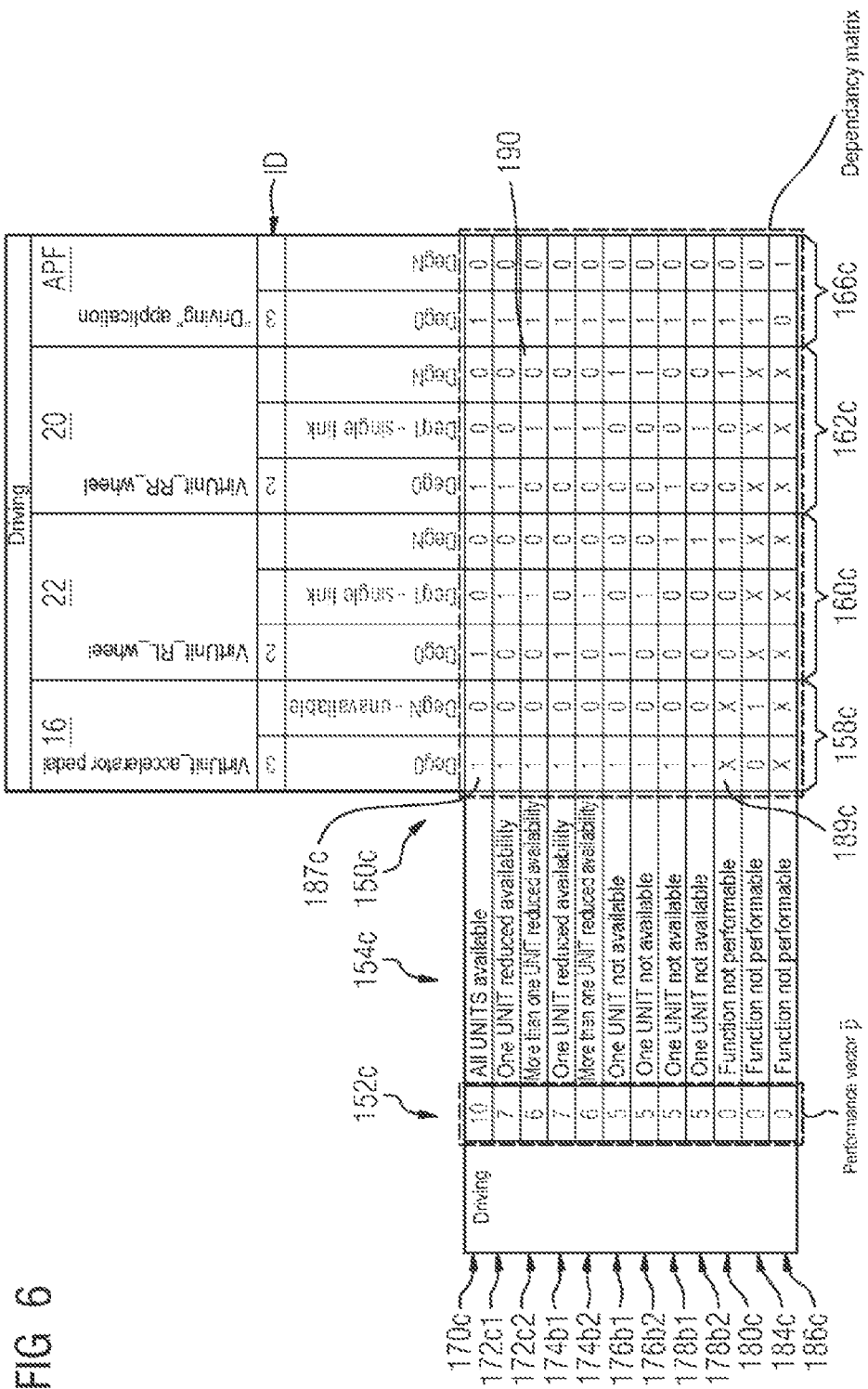
FIG. 6 shows the dependency matrix A based on a third design level.

Taking the example, the dependency matrix A or $\vec{A}$ is obtained for the "driving" function as shown in table 4, see FIG. 6. Binary mapping may be involved, since the dependency matrix A contains only the values 0 and 1. Binary mapping is possible by eliminating OR functions "|" and symbols "X" for units or degradation levels of units that have no influence on the relevant performance level.

For determination of the performance value, the set of rules shown in FIG. 8 or table 5 can apply. This set of rules can apply for the following applications, for example, regardless of application:

driving, and/or braking, and/or steering, and/or assistance: such as ABS (antilock braking system) and/or ESP (electronic stability program) and/or fully automatic driving.

Step b) Derivation of the degradation matrix

The degradation matrix X may be composed of degradation levels for a unit that are computed cyclically, for example at an interval of less than 50 milliseconds, less than 10 milliseconds or less than 5 milliseconds, in the RTE (Run Time Environment). In this case, it can be assumed, by way of example, that a separate variable is used for each degradation level of a unit, which variable can have e.g. the values 0 and 1.

Figure 5:
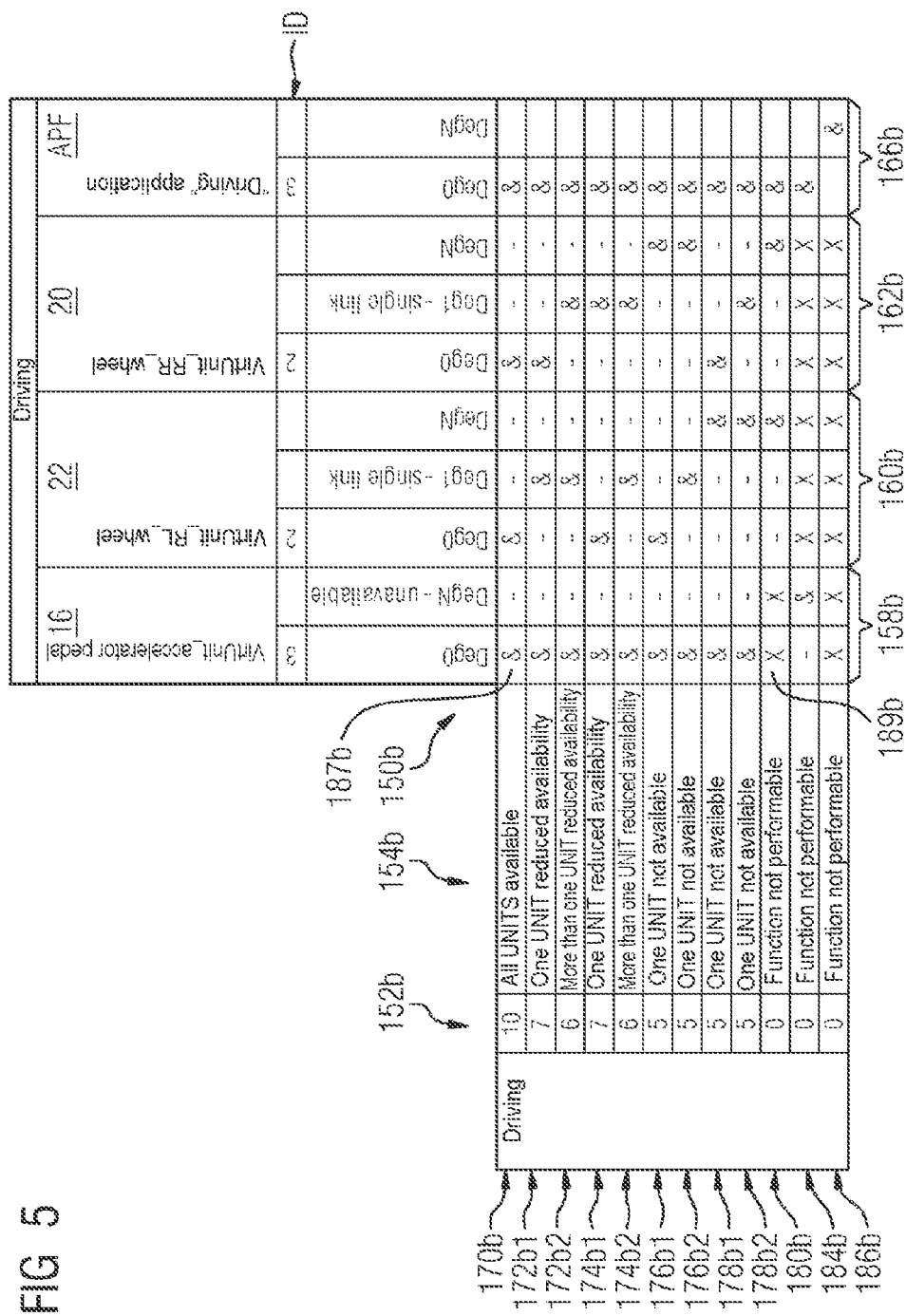
FIG. 5 shows the dependency matrix A based on a second design level.
Figure 10:
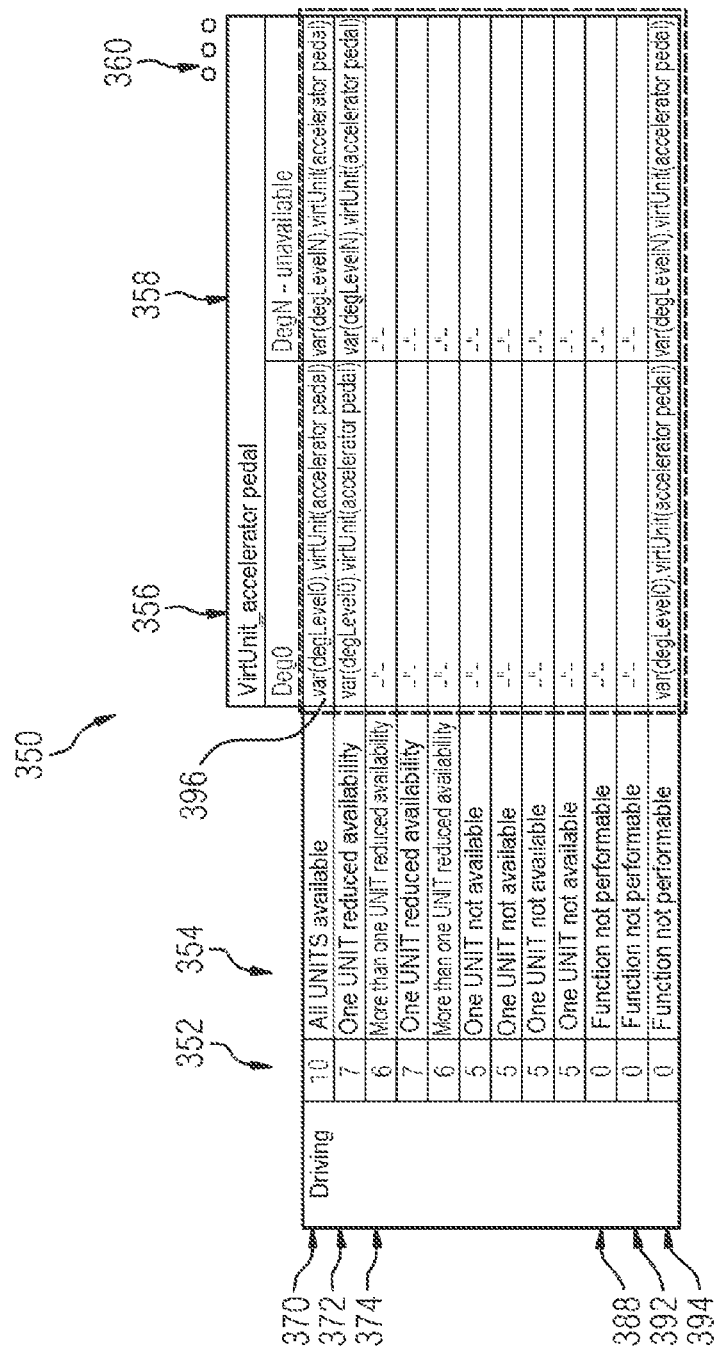
FIG. 10 shows a degradation matrix for the "driving" function or application.

The columns of the degradation matrix X or $\vec{X}$ represent those degradation levels of the units that are relevant for determination of the dependency matrix. FIG. 5 shows the meaning of the columns using the example and clarifies it by means of a frame. FIG. 10 shows a detail from the degradation matrix X. In the degradation matrix X or $\vec{X}$, the quantities available in the software (SW) for describing the degradation level of virtual units are denoted as follows, for example:

$$\text{Var}(\text{degLevel}(i))\cdot\text{virtUnit}(k) \quad \text{Formula (2)}$$

By way of example, these degradations are obtained from a degradationLevel variable of attribute_performanceLevel_t type in a unitStatus_t structure.

The association shown in table 6 or FIG. 9 between the decimal value of the degradationLevel variable and the associated DegLevel for the unit classes stipulated above is obtained, where an "X" corresponds to the value "1", for example, and a "–" corresponds to the value 0.

The units may be configured in the RTE (Run Time Environment). Each input and output datum for an application (i) can be assigned precisely one unit.

Using the example, the degradation matrix X is obtained for the driving function as shown in FIG. 10 for a detail from the degradation matrix X. The columns that are not shown contain the following assignments:

VirtUnit_RL_wheel, Deg0, Deg1—single link, DegN→
var(degLevel0).virtUnit(RL_wheel),
var(degLevel1).virtUnit(RL_wheel) or
var(degLevelN).virtUnit(RL_wheel), VirtUnit_RR_wheel, Deg0, DegN—single link, DegN→
var(degLevel0).virtUnit(RR_wheel),
var(degLevel1).virtUnit(RR_wheel) or
var(degLevelN).virtUnit(RR_wheel), optionally, if central drive motor:

VirtUnit_drive motor, Deg0, DegN—unavailable→var (degLevel0).virtUnit(drive motor),
var(degLevelN).virtUnit(drive motor), "driving" application, Deg0 (Running), DegN (Isolated)→
var(degLevel0).virtUnit(driving application),
var(degLevelN).virtUnit(driving application).

In this case, it holds that each column of the degradation matrix X can contain only the value 1 or only the value 0, which is explained in even more detail below with reference to FIGS. 12 and 13.

Step c) Extraction of the Performance Vector

Figure 11:
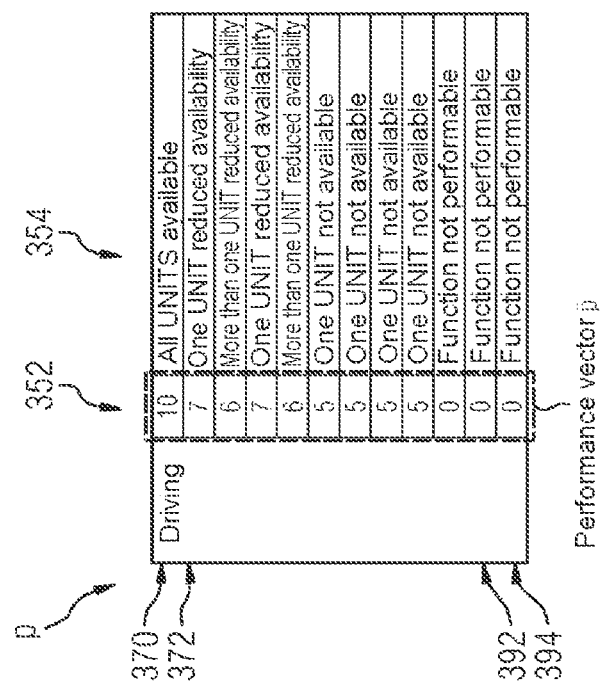
FIG. 11 shows a performance vector.

In the third step, the performance vector p or $\vec{p}$ can be read off from the initial table 4 or from FIG. 6, for example, as shown in FIG. 11 (table 7).

Step d) Derivation of the Correction Matrix K or $\vec{K}$

When computing $$\vec{C}(\vec{X}*\vec{A}^T) \quad \text{Formula (3)}$$

a matrix is produced in which, by way of example, only the elements on the main diagonal are of interest, that is to say all $c_{ii}$. The correction matrix $\vec{K}$ ensures that following performance of the operation $$\vec{D}=((\vec{X}*\vec{A}^T)-\vec{K}) \quad \text{Formula (4)}$$

there is a matrix for which only the elements $d_{ii}$ are < > (not equal to) 0. It thus holds that:

$$\vec{K} = \begin{bmatrix} 0 & \cdots & -(\vec{X}*\vec{A}^T)_{1n} \\ \vdots & \ddots & \vdots \\ -(\vec{X}*\vec{A}^T)_{m1} & \cdots & 0 \end{bmatrix} \quad \text{Formula (5)}$$

Step e)—Transfer of Matrix D or $((\vec{X}*\vec{A}^T)-\vec{K})$ to a Vector

Before the valid performance value $p_i$ can be extracted from $\vec{p}$, the matrix $(\vec{X}*\vec{A}^T)-\vec{K}$ can be converted into a vector. Since $(\vec{X}*\vec{A}^T)-\vec{K}$ only the elements $d_{ii}$ are now < > (not equal to) 0, multiplication by the "identity vector" $\vec{e}$, for example, suffices. It holds that:

$$\vec{e} = \begin{pmatrix} 1 \\ 1 \\ \vdots \end{pmatrix} \quad \text{Formula (6)}$$

It follows therefrom that:

$$\text{sgn}^{AppMa}\left[\left((\vec{X}*\vec{A}^T)-\vec{K}\right)*\vec{e}\right] = \vec{p}^T * \begin{pmatrix} \text{sgn}^{AppMa}(d_{11}) \\ \text{sgn}^{AppMa}(d_{22}) \\ \vdots \end{pmatrix} \quad \text{Formula (7)}$$

$$\text{sgn}^{AppMa}(x) := \begin{cases} 1, & \text{if } x = \text{number of virtual units for } Appli(i) \\ 0, & \text{otherwise} \end{cases} \quad \text{Formula (8)}$$

Step f)—Extraction of the Currently Valid Performance Value or performance level value of the application (i) under consideration The ultimately currently available performance level for the application (i) is finally obtained as:

$$y = \vec{p}^T * \text{sgn}^{AppMa}\left[\left((\vec{X}*\vec{A}^T)-\vec{K}\right)*\vec{e}\right] = \vec{p}^T * \begin{pmatrix} \text{sgn}^{AppMa}(d_{11}) \\ \text{sgn}^{AppMa}(d_{22}) \\ \vdots \end{pmatrix} \quad \text{Formula (9)}$$

where the elements d11 to dnn contain the value 1 only once and all other values are 0.

It is thus possible to use a correction matrix K, particularly in order to obtain a unified mathematical representation. Alternatively, no correction matrix K is used, so that steps e) and f) can be dispensed with. The elements d11 to dnn can then be taken directly from the matrix C, for example from the main diagonal or from a row.

Step 3: Performance Levels of Function Clusters/Partition

Task: The task of "APPCLUSTER Performance Calculation" may be to take the performance of all application software components of an APPCLUSTER as a basis for computing a single performance value for the whole performance cluster PC.

Fundamental approach: The challenge is to find a method that can be extended within the framework of Plug and Play (PnP) in order to transmit the performance level of a plurality of application software components to a performance level of an APPCLUSTER.

For a first implementation, the following strategy can be pursued:

TABLE 8

| Performance level of a performance cluster | Selection criterion |
|---|---|
| GREEN | All applications (i) of the performance cluster PC(j) are available with full performance. |
| YELLOW1 | A less important application (i) from the performance cluster (j) has reduced availability (YELLOW3 or YELLOW4) for at least one unit/functional unit |
| YELLOW2 | A second most important application (i) from the performance cluster (j) has reduced availability (YELLOW3 or YELLOW4) for at least one unit/functional unit |
| YELLOW3 | A most important application (i) from the performance cluster (j) has reduced availability (YELLOW3 or YELLOW4) for at least one unit/functional unit OR a less important application has the availability YELLOW5, i.e. unit absent but no degradation experienceable by the customer and no termination of driving assignment |
| YELLOW4 | More than one application (i) from the performance cluster (j) has reduced availability (YELLOW3 or YELLOW4) for at least one unit, OR second most important application (i) has performance level YELLOW5, i.e. unit absent but no degradation experienceable by the customer and no termination of driving assignment, OR a less important application (i) has performance level YELLOW6, i.e. unit absent with degradation experienceable by the customer and no termination of driving assignment |
| YELLOW5 | Most important application (i) has performance level YELLOW5, i.e. unit absent but no degradation experienceable by the customer and no termination of driving assignment, OR second most important application (i) has unit absent with degradation experienceable by the customer and no termination of driving assignment |
| YELLOW6 | Most important application (i) has performance level YELLOW6, i.e. unit absent with degradation experienceable by the customer and no termination of driving assignment, OR a less important application (i) has YELLOW7 or YELLOW8, OR all less important other applications have a performance level worse than YELLOW6, i.e. termination of the service assignment |

TABLE 8-continued

| Performance level of a performance cluster | Selection criterion |
|---|---|
| YELLOW7 | Most important application (i) has YELLOW7, i.e. termination of the service assignment, OR second most important application (i) has YELLOW7 or YELLOW8, OR all less important other applications (i) have a YELLOW9 performance |
| YELLOW8 | Most important application (i) has YELLOW8, i.e. second performance impairment, OR second most important application (i) has YELLOW9, i.e. termination of the driving assignment, OR a less important application (i) has a RED performance |
| YELLOW9 | Most important application (i) has YELLOW9, OR second most important application (i) has RED performance |
| RED | The most important application (i) or one of the most important applications (i) has a maximum degradation. |

In this case, i and j are natural numbers 1, 2, 3, etc. There may also be multiple most important applications and/or multiple second most important applications.

Since, according to the definitions above in table 8, multiple performance levels for a cluster can apply, the worst performance level (PL) is used for all further considerations and the other performance levels are rejected. Thus, what is known as a WORST( ) function is applied.

Figure 15:
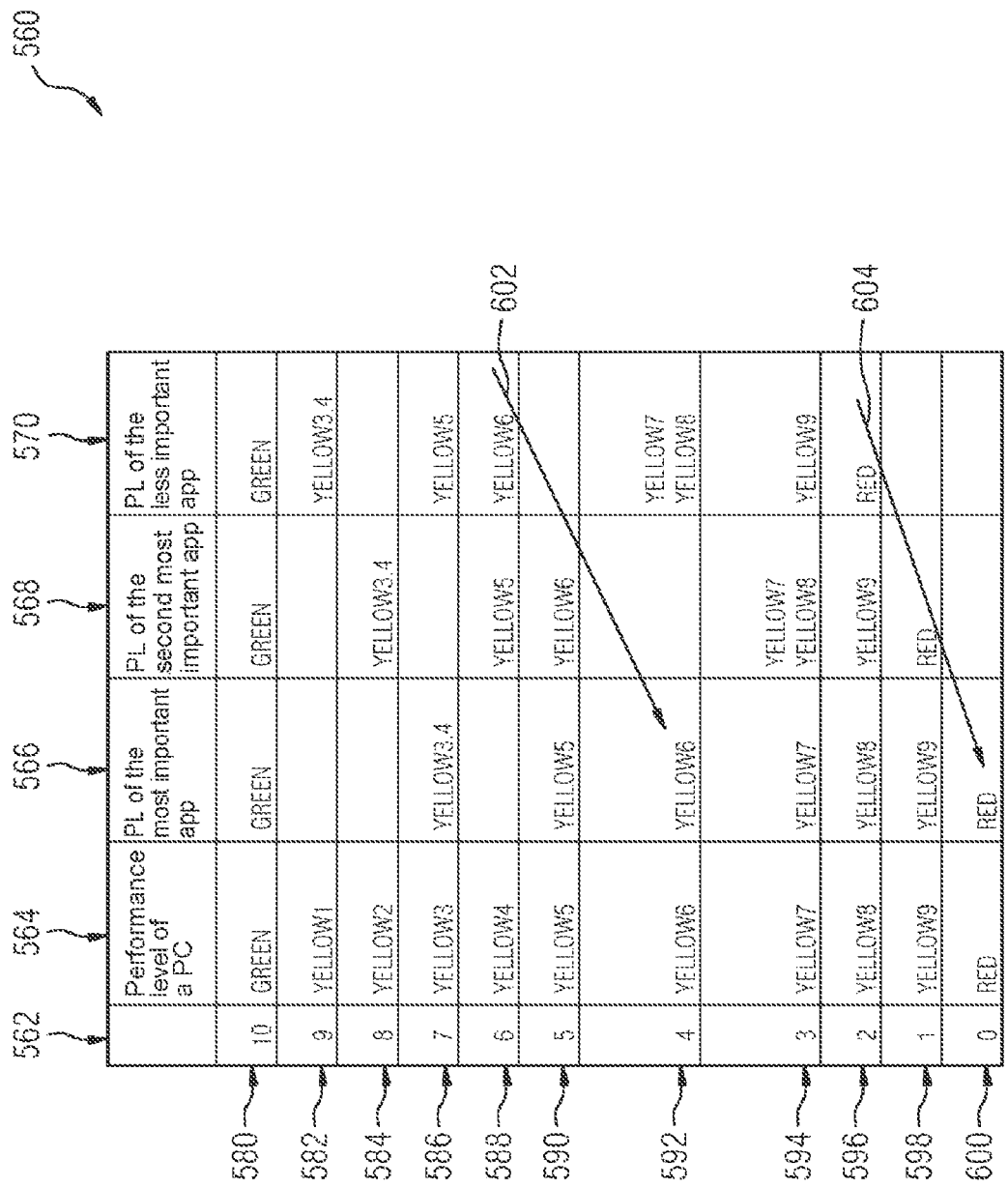
FIG. 15 shows a table that shows the principle of ascertainment of the performance level of a cluster comprising multiple applications.

Determination of the performance level of a performance cluster PC follows the principle illustrated in FIG. 15 (table 9), for example. In this case, the following degradation information can be used:

An application (i) can have maximum degradation if it is not executable or its DL (direct law) app or DL application is executed. The DL application is a substitute application for the case in which the actual "normal law" app has caused an error that can be associated with it precisely. A direct law application is implemented in a very simple manner and may be a training case for the driver, but is just sufficient for a trained driver still to be able to stop the vehicle safely.

"Reduced availability of an application (i)" can mean that the performance of the latter is better than or equal to YELLOW4.

It is also possible to use other stipulations for the performance levels both for the applications and for the clusters, particularly a different number of performance levels. Thus, a systematic method for abstracting a piece of functionally specific information into a piece of functionally unspecific generic, that is to say comparable, information is described. The abstraction can include rating tables and also of methods/transfer functions according to the explanations above and below. These also feature the rating tables.

The properties, features and advantages of this invention that are described above and also the way in which they are achieved will become clearer and more distinctly comprehensible in conjunction with the description of the exemplary embodiments that follows. Where the term "can" or "may" is used in this application, this relates both to the technical possibility and to the actual technical implementation. Where the term "approximately" is used in this application, this means that the exact value is also disclosed.

FIG. 1 shows functional units or units in an automobile 10. The automobile 10 is a car, for example, and contains:
a front right wheel FR,
a front left wheel FL,
a rear right wheel RR,
a rear left wheel RL,
a battery 12 and (hybrid)/or a fuel tank 12,
a steering wheel 14,
an accelerator pedal 16,
two control units 18, 18b,
a wheel unit 20 for the rear right wheel RR, i.e. e.g. electric motor, inverter and/or control electronics,
a wheel unit 22 for the rear left wheel RL, i.e. e.g. electric motor, inverter and/or control electronics.

Instead of the two wheel hub motors, it is also possible to use a central drive motor M, e.g. an electric motor, internal combustion engine or a hybrid motor. Alternatively, four electrical wheel hub motors can also be used.

The controller 18 contains:
a data memory M1, for storing data and program commands,
a processor P, e.g. a microprocessor or a microcontroller, or multiple processors,
one or more program function(s), e.g. "driving", APF for short, i.e. a software function.

Alternatively, the controller 18 can also be designed without programs just as an electronic circuit, e.g. using
ASICs (application specific integrated circuits) or a similar circuit whose wiring can be programmed.

The controller 18 is shown as part of a central controller. Alternatively, the controller 18 can also be part of a local controller.

The controller 18 is connected to a bus system 24 and therefore forms a network node. The bus system 24 is an Ethernet, a CAN (controller area network) network or a FlexRay bus, for example. Alternatively, a LAN (local area network) can also be used as bus system 24, particularly a LAN of redundant design that forms two ring structures at the logical level, for example.

By way of example, there are the following connections between the bus system 24 and the aforementioned functional units:
a connection 30 to the accelerator pedal 16,
a connection 32 to the steering wheel 14,
an optional connection 34 to the optional central motor M,
a connection 36 to the wheel unit 22, and
a connection 40 to the wheel unit 20.

Alternatively, a front wheel drive or an all-wheel drive can also be used.

By way of example, the controller 18b is designed in the same way as the controller 18. The controller 18b is connected to the units 14, 16, M, 20 and 22 explained above via a bus system 24b.

The power supply for the units shown in FIG. 1 can also be of duplicate or multiple redundant design.

A method as explained below with reference to FIG. 2 or another method takes the performance values/degradation values of the functional units 14, 16, M, 20, 22, APF, etc., as a basis for determining which controller 18, 18b is currently meant to be active and which is inactive. Active means that driving is controlled by the active controller. Inactive can mean that the relevant controller is off or that the relevant controller is operating, but the control signals are not used for controlling the automobile 10 at present. In this context, the term master/servant or master/slave method is also used. Ascertainment of single performance values and of total performance values is explained below with reference to FIGS. 3 to 16, the comments not necessarily referring to the configurations shown in FIGS. 1 and 2 but rather having more general validity.

FIG. 2 shows two reciprocally redundant applications comprising functional units for the "driving" application. FIG. 2 shows a two-channel wheel actuator 50 in highly simplified form.

A first actuator channel 54 contains:
the accelerator pedal 16, which is not duplicated,
a communication link K1ab, e.g. a portion of a bus system, between the accelerator pedal 16 and a data processing system or control unit DVAa or 18,
a communication link K2ab, e.g. a portion of a bus system, between the control unit DVAa and the wheel units 20, 22, which are likewise not duplicated.

A second actuator channel 56 contains:
likewise the accelerator pedal 16, which is not duplicated,
the communication link K1ab, e.g. a portion of a bus system, between the accelerator pedal 16 and a data processing system or control unit DVAb or 18b,
the communication link K2ab, e.g. a portion of a bus system, between the control unit DVAb and the wheel units 20, 22, which are likewise not duplicated.

The first actuator channel 54 is active as master M. The second actuator channel 56 is classified as a slave/servant D at present, for example, i.e. it is not active at present but forms a fallback position in the event of an error in the first actuator channel 54.

The control units DVAa and DVAb constantly, e.g. at time intervals of less than 50 milliseconds, perform a status query or error detection 60 and 62 for the first actuator channel 54 and the second actuator channel 56, respectively. On the basis of the query results, single performance values for the units or network nodes and total performance values for the application that forms the actuator channel 54 or 56 in question are then ascertained. In principle, this can involve proceeding as explained below with reference to FIGS. 3 to 14 or 3 to 16. Multiple applications can also form a cluster for which a cluster performance value can be ascertained, which is explained below particularly with reference to FIGS. 15 and 16. Master/slave methods without cluster formation are also possible, however.

The cited performance values can be ascertained either in the controller DVAa, in the controller DVAb, in both controllers DVAa and DVAb redundantly or in a superordinate controller.

The data processing system (computer) DVAa may have the following program functions installed on it, in particular:
driving program function APFa,
steering program function APLa,
braking program function APBa, and possibly
further program function(s) 57a (ABS (antilock braking system), ACC (automatic cruising control), ESP (electronic stability program), etc.)

The data processing system (computer) DVAa may have the following program functions installed on it, in particular:
driving program function APFb, which is redundant in relation to APFa,
steering program function APLb, which is redundant in relation to APLa,
braking program function APBb, which is redundant in relation to APBa, and possibly
further program function(s) 57b (ABS (antilock braking system), ACC (automatic cruising control), ESP (electronic stability program), etc.), which are redundant in relation to 57a.

The program function APF forms a cluster with just one program function, for example, or is not associated with a cluster. The program functions APL and APB form a cluster with multiple program functions or functional unit groups, for example, which is explained in more detail below. For the cluster, a scalar performance level is computed, which is then used to select master M and slave D.

For these program functions APF, APL, APB, etc., and/or the functional units used thereby, the performance values (performance levels), as explained in more detail below, are computed and are stored in at least one database or, for redundancy reasons, in two databases DBa and DBb, for example.

Both databases DBa, DBb can be used to store the same data. By way of example, the data processing system DVAa, the system DVAa for short, normally accesses the database DBa. By way of example, the data processing system DVAb, the system DVAb for short, normally accesses the database DBb. Between the databases DBa and DBb, it is possible for a collation 58 of the data to take place.

In connection with the collation 58 of the data, reference is made to the aforementioned thesis [2] by M. Armbruster, for example. Assuming a simplified view, i.e. without taking account of issues in relation to an asynchronous start and other asynchronisms, for example, it can hold that the two systems DVAa and DVAb have the same perspective of themselves and of all other units in the network with the aid of a data consistency method. If the perspectives are identical, the system DVAa is prioritized in comparison with the system DVAb, for example, i.e. the system DVAa is then the master M.

Differences in perspectives and hence different performance levels for the program functions APF, APL, APB, etc. can arise if differences or errors occur in the data transmission, for example, at a logical level.

There may thus be two data transmission ring structures that each contain the relevant functional units and the systems DVAa and DVAb. In particular, the systems DVAa and DVAb may be connected to one another via two ring segments. Data transmission directions in the ring structures can be effected via the stipulation of ports, i.e. at logical level. If a port fails, for example, then the data transmission continues in the other direction, but the perspectives of the systems DVAa and DVAb may then be different.

FIG. 3 shows the stipulated classes for the performance or effectiveness of units or network nodes in a degradation table 100. The degradation table 100 has columns 102 to 108 having the following content:
column 102 contains an identifier (ID identification) for the respective unit type,
column 103 indicates the unit type, with the redundancy features explained below being taken into account,
column 104 indicates whether a degradation level 0 is stipulated for the unit type of the relevant row of table 100 and how the degradation level is defined,
column 106 indicates whether a degradation level 1 is stipulated for the unit type of the relevant row of table 100 and how the degradation level is defined, and
column 108 indicates whether a degradation level 2 is stipulated for the unit type of the relevant row of table 100 and how the degradation level is defined.

A column that is not shown stipulates a degradation level N for all unit types, where N is a natural number that indicates the highest degradation, e.g. decimal value 10, see also FIG. 9, PL_RED (performance level RED).

It is also possible for more columns or fewer columns and/or more identifiers ID or fewer identifiers ID to be stipulated.

When the unit type is stipulated, the following redundancy features can be taken into account:
no redundancy for a functional unit or redundancy through redundantly provided functional units, i.e. there is only the one functional unit for this function,
no value redundancy or value redundancy with respect to a functional unit, for example the values are repeatedly ascertained and also repeatedly transmitted,
no communication redundancy, particularly communication link redundancy, or multiple communication redundancy, particularly communication link redundancy.

A first row 110 relates to the identifier ID with the value 1, for example. This value has the associated unit type "simplex/single/single-link", for example, i.e. no redundancy for the unit, no value redundancy and no communication redundancy. The degradation level 0 obtains when there is no error in this unit. Other degradation levels apart from the degradation level N, particularly the degradation levels 1 and 2, are not defined for the unit type "simplex/single/single-link".

A second row 112 relates to the identifier ID with the value 2, for example. This value includes the unit type "simplex/single/dual-link", for example, i.e. no redundancy for the unit, no value redundancy but duplicate or dual communication redundancy. The degradation level 0 obtains when there is no error in this unit. The degradation level 1 obtains when a communication link is erroneous. The degradation level 2 is not defined for the unit type "simplex/single/dual-link". The wheel actuators 20, 22 have the unit type with the value 2, for example, i.e. "simplex/single/dual-link".

A third row 114 relates to the identifier ID with the value 3, for example. This value includes the unit type "simplex/dual/single-link", for example, i.e. no redundancy for the unit, value redundancy and no communication redundancy. The degradation level 0 obtains when there is no error in this unit. Other degradation levels apart from the degradation level N, particularly the degradation levels 1 and 2, are not defined for the unit type "simplex/dual/single-link". The accelerator pedal 16 has the unit type "simplex/dual/single-link", for example.

Further rows between the rows 114 and a row 128 also feature the following values, for example:
"duplex" for unit redundancy,
"dual-dual" for value redundancy,
"duplex" for value redundancy, and
"duo-duplex" for value redundancy.
The meanings here are as follows:
duplex: value redundancy with two bit-identical values,
dual: value redundancy with two delta-consistent values, i.e. e.g. absolute value (value A−value B)<delta, and
duo-XXXX: there is XXXX value redundancy comprising two physical boxes or units. A penultimate row 128 has the identifier ID equal to 10, the unit type "duplex/duo-duplex/dual-link", i.e. redundancy for the unit, quadruple (two network nodes with two sensor values each, with two values per network node each being compared, but never the values of the two network nodes with one another) value redundancy and duplicate communication redundancy. The degradation levels are defined as follows:

Deg level 0: no error,
Deg level 1: loss of a link,
Deg level 2: loss of a sensor pair.

A last row 130 relates to the unit type "simplex/duo-triple/dual-link", for example. The degradation levels for this unit type are yet to be stipulated, i.e. tbd (to be defined). The last row 130 can also be omitted.

FIG. 4 shows a dependency matrix 150a or A based on a first design level. The dependency matrix 150a relates to the "driving" application. The following association with or in the dependency matrix 150a or A applies:
the column 152a provides the performance level value for the relevant row 170a to 186a,
the column 154a contains a verbal explanation of the performance level,
the accelerator pedal 16 has a corresponding "VirtUnit accelerator pedal" unit, see the two columns 158a associated with the degradation level 0 or N from left to right,
the wheel actuator 22 has a corresponding "VirtUnit RL wheel" unit, see the three columns 160a associated with the degradation level 0, 1 or N from left to right,
the wheel actuator 20 has a corresponding "VirtUnit RR wheel" unit, see the three columns 162a associated with the degradation level 0, 1 or N from left to right, and
the APF has a corresponding "driving" application, see the two columns 166a associated with the degradation level Deg0 ("running")
or DegN ("isolated") from left to right.

A first row 170a of the dependency matrix 150a, A relates to a performance state in which all units are available, i.e. there is no error. As explained below with reference to FIG. 8, a performance level with the value 10 therefore obtains. An "&" (AND function symbol), particularly element 187a, indicates that the unit 16 and the unit 22 and the unit 20 and the "driving" program have the single degradation level Deg0 or "Running". All units 16, 22, 20 and the "driving" program are accordingly available.

A second row 172a of the dependency matrix 150a, A relates to a performance state in which at least one unit has reduced availability. This corresponds to the performance level with the value 7 or 6, see also FIG. 8. By way of example, the wheel actuator 22 or "VirtUnit_RL_wheel" has the degradation level 1. In this case, it is a matter of the states Deg0 (degradation level 0) or Deg1 (degradation level 1) of the wheel actuator 20 or "VirtUnit_RR_wheel", see "1" (OR function) in the element 188a and also the OR function situated beside it.

A third row 174a of the dependency matrix 150a, A likewise relates to the performance state in which at least one unit has reduced availability. This again corresponds to the performance level with the value 7 or 6, see also FIG. 8. By way of example, the wheel actuator 20 or "VirtUnit_RR_wheel" then has the degradation level 1. In this case, it is a matter of the states Deg0 (degradation level 0) or Deg1 (degradation level 1) of the wheel actuator 22 or "VirtUnit_RL_wheel", see "|" (OR function) in the first two columns of the columns 160a, i.e. relating to the degradation levels Deg0 and Deg1 of the wheel actuator 22.

Moreover, the dependency matrix 150a, A has two rows 176a and 178a stipulated in it relating to the degradation level with the value 5, i.e. one unit is not available (DegN), for example the wheel actuator 20, it being a matter of the states Deg0 and Deg1 of the other wheel actuator 22, or the wheel actuator 22 is not available, i.e. DegN, it being a matter of the states Deg0 and Deg1 of the wheel actuator 20, see corresponding "|" symbols, in the row 174a and in the row 176a.

The dependency matrix 150a, A moreover has three rows 180a to 186a stipulated in it that relate to the degradation level 0, "i.e. function not performable". In this case, a symbol "X", for example see element 189a, denotes states or degradation levels that matter. The cells or rows containing an "X" (always with respect to a unit) can be resolved still further, which is explained in more detail below with reference to FIG. 6 for a row 180c corresponding to the row 180a and with reference to FIG. 7 for a row 186c corresponding to the row 186a. The symbol "–" means that a particular degradation level is not present.

By way of example, the "driving" function is not performable when both wheel actuators 22 and 20 have the degradation level DegN, see row 180a, when the accelerator pedal 16 has the degradation level DegN, see row 184a, or when the "driving" program is in the "isolated" state, see row 186a.

Hence, the dependency matrix 150a, A in the example initially has 10 columns 158a to 166a and 8 rows 170a to 186a.

In other exemplary embodiments, the dependencies in the dependency matrix 150a, A are stipulated differently than shown in FIG. 4, particularly using more or fewer or other units, programs, i.e. (columns), and/or using more or fewer or other rows or total degradation levels.

FIG. 5 shows the dependency matrix A based on a second design level in which the dependency matrix 150b is produced from the dependency matrix 150a. The columns 152a to 166a have corresponding columns 152b to 166b. The row 170a has a corresponding row 170b. The OR functions in the row 172a have been resolved by replacing this row 172a with the augmented rows 172b1 and 172b2, wherein the row 172b1 contains an "&" symbol in the Deg0 column of the columns 162b and the row 172b2 contains an "&" symbol in the Deg1 column of the columns 162b. For column 152b, row 172b2, a performance level value of 6 is obtained, i.e. YELLOW4—"more than one unit has reduced availability".

The OR symbols in the rows 174a, 176a and 178a have been resolved in a similar manner, see augmented rows 174b1, 174b2; 176b1, 178b2 and 178b1, 178b2. For column 152b, row 174b2, a performance level value of 6 is again obtained, i.e. YELLOW4—"more than one unit has reduced availability".

Accordingly, the dependency matrix 150b contains an element 187b that corresponds to the element 187a and a matrix element 189b that corresponds to the element 189a. The element 188b and the matrix element situated to the right thereof, i.e. the OR functions, are no longer present, on the other hand. They are now replaced in the two rows 172b1 and 172b2 by a two by two matrix, each row of this submatrix containing an "&" symbol and "–" or a "–" symbol and an "&" symbol. Outside this submatrix, the values have been transferred from the row 172a to the rows 172b1 and 172b2 without alteration. A similar scenario applies again for the other augmented rows 174b1 to 178b2.

FIG. 6 shows the dependency matrix A based on a third design level in which the dependency matrix 150c is produced from the dependency matrix 150b by replacing the "&" symbols with the value "1", for example. The "–" symbols are each replaced with the value "0", for example. In another exemplary embodiment, the values "0" and "1" are used straight away without resorting to the "&" and "–" symbols, which may be simpler to understand. Thus, the "&" element 187b of the matrix 150b has a corresponding "1" element 187c in the matrix 150c.

The columns 152b to 166b have corresponding columns 152c to 166c. The row 170b has a corresponding row 170c. The augmented rows 172b1 to 178b2 have corresponding augmented rows 172c1 to 178c2. The rows 180b to 186b have corresponding rows 180c to 186c, the rows 180c to 186c still containing "X" symbols, for example see the element 189c corresponding to the element 189b.

These "X" symbols are resolved for the row 180c by generating from the row 180c two new rows whose elements are transferred without alteration to the locations at which there is no "X" from the row 180c. The first freshly generated row has a "1" entered in it instead of the "X" in the element 189c, for example, and has a "0" entered in it instead of the "X" situated to the right thereof.

Alternatively, the "X" symbols can also be resolved into "&" symbols in the dependency matrix 150b itself in the same way, the "&" symbols being able to be replaced by the "1" values and the "–" symbols being able to be replaced by the "0" values in a next step.

The resolution of the "X" symbols in the row 186c is explained in more detail below with reference to FIG. 7, reference being made to the columns 158c, 160c and 162c in which the "X" symbols occur. The "0" and "1" values in row 186c, column 166c, are again transferred without alteration to all augmented rows. The "X" symbols in the row 184c are resolved in a similar manner.

A detail 190 from the dependency matrix 150c contains the crossover elements from the columns 160c, i.e. wheel actuator 22 or VirtUnit_RL_wheel, and the columns 162c, i.e. wheel actuator 20 or VirtUnit_RR_wheel, with the rows 170c, 172c1 to 178c2. The detail 190 is used particularly in FIGS. 12 and 13 in order to explain the progress of the further computations in a simple manner. In the automobile 10, the whole dependency matrix A is usually used for the further computation, the dependency matrix A also being able to be substantially larger than the dependency matrix 150c, including the still resolved "X" symbols. By way of example, the dependency matrix A then has more than 50 columns and/or more than 50 rows.

FIG. 7 shows a detail 196 from the dependency matrix A based on the third design level. The detail 196 shows the columns 158c, 160c and 162c in which the "X" symbols occurred in the row 186c. Instead of the row 186c, 18 rows 186c1 to 186c18 are augmented that list all permutations that can arise for the degradation levels Deg0, DegN of the accelerator pedal 16, the degradation levels Deg0, Deg1, DegN of the wheel actuator RL, 22 and for the degradation levels Deg0, Deg1, DegN of the wheel actuator RR, 20.

In column 162c, for example, there are thus three groups for the "1" value of the degradation level DegN, Deg1 and Deg0 of the wheel actuator RR, 20, each group containing 6 rows in each case. Within the first 6 rows, there are three subgroups for the "1" value of the degradation level DegN, Deg1 and Deg0 of the wheel actuator RL, 22, each subgroup containing two rows in each case. Within each subgroup, the rows differ in terms of the "1" value for the degradationlevel degN of the accelerator pedal 16 and in terms of the "1" value for the degradation level Deg0 of the accelerator pedal 16. The elements of a row that are not mentioned have the value "0". The order of the permutations can also differ from the order shown, so long as all permutations are taken into consideration.

A corresponding scenario applies for the 6 rows in the second group (RR unit, 20; Deg1=1) and for the 6 rows in the third group (RR unit, 20; Deg0=1). Three dots at the end of the rows 186c1 to 186c18 indicate the transfer of the "01" values from the row 186c in each case.

FIG. 8 shows the stipulation of performance levels for multiple applications or program functions that for their part each contain multiple units or network nodes. The stipulations can be made in the form of a table 200 or in another manner.

The table 200 contains columns 202 to 206 having the following meaning:

The column 202 contains decimal values for the performance levels beginning with "10", for example, for the best performance value through to the value "0" for the worst performance value. It is also possible for more or fewer or other decimal values and hence performance levels PL to be stipulated.

The column 204 contains a more comprehensible description of the respective performance level PL beginning with GREEN for the best performance value through YELLOW1 to YELLOW9 for average performance values to RED for the worst performance value or for the greatest degradation level. The column 204 is optional.

The column 206 contains the selection criterion or the selection condition for a particular performance level PC to apply in verbal form or in another suitable form.

The table 200 contains rows 210 to 230 having the following meaning:

The row 210 relates to the performance level GREEN with the value "10", performance level "GREEN" occurring when all other applications (j) on which the application (i) is dependent are available without degradation or without impairment.

The row 212 relates to the performance level YELLOW1 with the value "9", the performance level YELLOW1 being undefined at present and hence possibly being able to be omitted.

The row 214 relates to the performance level YELLOW2 with the value "8", the performance level YELLOW2 likewise being undefined at present and hence possibly being able to be omitted.

The row 216 relates to the performance level YELLOW3 with the value "7", the performance level YELLOW3 arising when a unit/network node has reduced availability.

The row 218 relates to the performance level YELLOW4 with the value "6", the performance level YELLOW4 arising when more than one unit/network node has reduced availability.

The row 220 relates to the performance level YELLOW5 with the value "5", the performance level YELLOW5 arising when at least one unit/network node fails or is absent and a control quality or a functional performance does not deteriorate in a manner experienceable by the customer.

The row 222 relates to the performance level YELLOW6 with the value "4", the performance level YELLOW6 arising when at least one unit/network node fails or is absent and a control quality or a functional performance deteriorates in a manner experienceable by the customer.

The row 224 relates to the performance level YELLOW7 with the value "3", the performance level YELLOW7 arising when at least one unit/network node fails or is absent and a control quality or a functional performance deteriorates in a manner experienceable by the customer and additionally the application (i) reports the need for unscheduled servicing, i.e. termination of the driving assignment but not of the service assignment.

The row 226 relates to the performance level YELLOW8 with the value "2", the performance level YELLOW8 arising when at least one unit/network node fails or is absent and a control quality or a functional performance deteriorates in a manner experienceable by the customer with worse performance than at the performance level YELLOW6. Optionally, it may be a requirement for the application (i) to report the need for unscheduled servicing, i.e. termination of the driving assignment but not of the service assignment.

The row 228 relates to the performance level YELLOW9 with the value "1", the performance level YELLOW9 arising when at least one unit/network node fails or is absent and a control quality or a functional performance deteriorates in a manner experienceable by the customer or the application (i) outputs a red warning, i.e. not yet performance level RED, i.e. assignment termination is necessary.

The row 230 relates to the performance level RED with the value "0", the performance level RED arising when the application (i) is not executable or DL (see the explanation above) is executed or the performance is worse than the performance of the performance level YELLOW9.

Hence, for stipulation of the performance levels at application level, particularly the criteria of customer experienceability and/or service assignment termination and/or driving assignment termination are taken into account. In other exemplary embodiments, the performance levels are stipulated in another way and/or using other criteria.

FIG. 9 shows an association between the decimal value of the "degradation level" variable and the associated degradation level and also for the classes of units or network nodes in a table 250. The table 250 contains columns 252 to 276 with the following content:—The column 252 defines variables PL_GREEN (performance level GREEN), PL_YELLOW1 to PL_YELLOW9 and a variable PL_RED. The name of the variables may also be PERFORMANCELEVEL_PL_GREEN, etc., for example in order to comply with a proprietary specification by the applicant or with a standard.

The column 254 indicates a decimal value for the variables, in this case in the range from 0 to 10 beginning with PL_GREEN through YELLOW1 to YELLOW9 to PL_RED.

The column 256 indicates the value of the degradation level, in this case from 0 to 9 and N beginning with PL_GREEN through YELLOW1 to YELLOW9 to PL_RED.

The 10 columns 258 to 276 correspond in this order to the 10 unit types shown in FIG. 3, line 110 to line 128, beginning with "simplex/single/single-link" and ending with "duplex/duo-duplex/dual-link".

The table 250 contains the following rows 280 to 300:

the row 280 relates to the variable PL_GREEN with the decimal value 0 and the degradation level 0. All unit types can have the degradation level 0, see crosses in all columns 258 to 276.

The row 282 relates to the variable PL_YELLOW1 with the decimal value 1 and the degradation level 1. All unit types apart from the unit types 1, 3 and 7 can have the degradation level 1, see crosses in the relevant columns 260, 264 to 268 and also 272 to 276.

The row 284 relates to the variable PL_YELLOW2 with the decimal value 2 and the degradation level 2. Only unit types 6 and 10 can have the degradation level 2, see crosses in the relevant columns 268 and 276.

The rows 286 to 298 relate to the variables PL_YEL-LOW3 to PL_YELLOW7 with the decimal values 3 to 9 and the degradation levels 3 to 9. These degradation levels have not been stipulated for the unit types affected in the columns 258 to 276 in the exemplary embodiment, which means that the table 250 contains the "-" symbol in each of these columns in the rows 286 to 298, indicating that the relevant degradation level for the relevant unit type is not available.

The row 300 relates to the variable PL_RED with the decimal value and the degradation level N. All unit types can have the performance level N, see crosses in all columns 258 to 276.

At the bottom edge of the table 250, the identifiers ID for the unit types for the columns 258 to 276 are recorded beginning with the value "1" through to the value "10". Hence, the table 250 essentially corresponds to the table shown in FIG. 3, but instead of the verbal explanations, the table 250 records only whether or not a relevant degradation level has been defined. Hence, the table 250 is easier for machines, particularly computation machines, to evaluate.

Depending on the present state of a unit, however, only one particular degradation level obtains in each case.

In other exemplary embodiments, there are other stipulations for the degradation levels of the unit classes and/or other stipulations for the decimal values and/or the values of the degradation levels. In particular, it is possible for more or fewer and/or other degradation levels to be used.

FIG. 10 shows a detail from a degradation matrix X or 350 for the "driving" function or application. FIG. 10 shows columns 352 and 354 in order to explain the meaning of the rows of the degradation matrix X or 350. The column 352 tallies with a performance vector p that indicates the performance levels for the individual rows 370 to 394 of the degradation matrix 350. The performance vector also tallies with the meaning of the rows of the dependency matrix A, for example see FIG. 6, column 152c. The column 354 describes the meaning of the individual performance levels or individual rows 370 to 394 in verbal form, this likewise tallying with the descriptions for the augmented dependency matrix A, for example see FIG. 6, column 154c.

It should be noted that, to improve clarity, the degradation matrix X or 350 has not yet been resolved in the last three rows 388 to 394, so that it is actually necessary for correspondingly more rows to be used in this case, as has been explained in detail above for the dependency matrix A, for example with reference to FIG. 7.

A first column 356 of the degradation matrix X or 350 is used to record values that relate to the accelerator pedal virtual unit, degradation level Deg0, for example see the value with the reference symbol 396 that is ascertained by means of the query var(degLevel0).virtUnit(accelerator pedal) in accordance with formula (2). By way of example, the value "1" is possible when this degradation level 0 obtains at present. The value "0" is ascertained for the query when the degradation level 0 does not obtain.

A second column 356 of the degradation matrix X or 350 is used to record values that relate to the accelerator pedal unit, degradation level DegN. In this case, the query var (degLevelN).virtUnit(accelerator pedal) is used, again in accordance with formula (2). By way of example, the value "1" is possible when this degradation level N obtains at present. The value "0" is ascertained for the query when the degradation level N does not obtain.

The further columns 360 of the degradation matrix X or 350 relate to:
VirtUnit_RL_wheel, Deg0, Deg1—single link, DegN→ var(degLevel0).virtUnit(RL_wheel),
var(degLevel1).virtUnit(RL_wheel) or
var(degLevelN).virtUnit(RL_wheel),
VirtUnit_RR_wheel, Deg0, DegN—single link, DegN→ var(degLevel0).virtUnit(RR_wheel),
var(degLevel1).virtUnit(RR_wheel) or
var(degLevelN).virtUnit(RR_wheel),
"driving" application, deg0 (running), DegN (isolated)→ var(degLevel0).virtUnit(driving application),
var(degLevelN).virtUnit(driving application).

The degradation matrix X or 350 shown in simplified form contains 12 rows 376 to 394 that are associated with the performance levels 10, 7, 6, 7, 6, 5, 5, 5, 5, 0, 0 and 0 in this order. Hence, there are again multiple rows for particular performance levels, e.g. 7, 6, 5 and 0, in this case 2, 2, 4 and 3 rows in each case.

In the exemplary embodiment, only the same values ever occur within a column of the degradation matrix X or 350, i.e. the value 0 or the value 1. Nevertheless, all rows are used in order to ensure a self-contained representation and a simple computation.

In other exemplary embodiments, the degradation matrix X or 350 has more than the columns and rows mentioned, for example more than 50 columns and/or more than 50 rows. In another exemplary embodiment, it is also possible for just one degradation vector to be set up that corresponds to the row 370 of the degradation matrix X or 350, for example.

FIG. 11 shows a performance vector p that applies for the degradation matrix X or 350 shown in FIG. 10, see column 352. The performance vector p also applies for the dependency matrix A, see FIG. 6, column 152c. Actually, the performance vector contains more rows than shown, however, since the dependency matrix A and also the degradation matrix X may also be extended by rows, e.g. for the purpose of resolving the "X" symbols.

Figure 12:
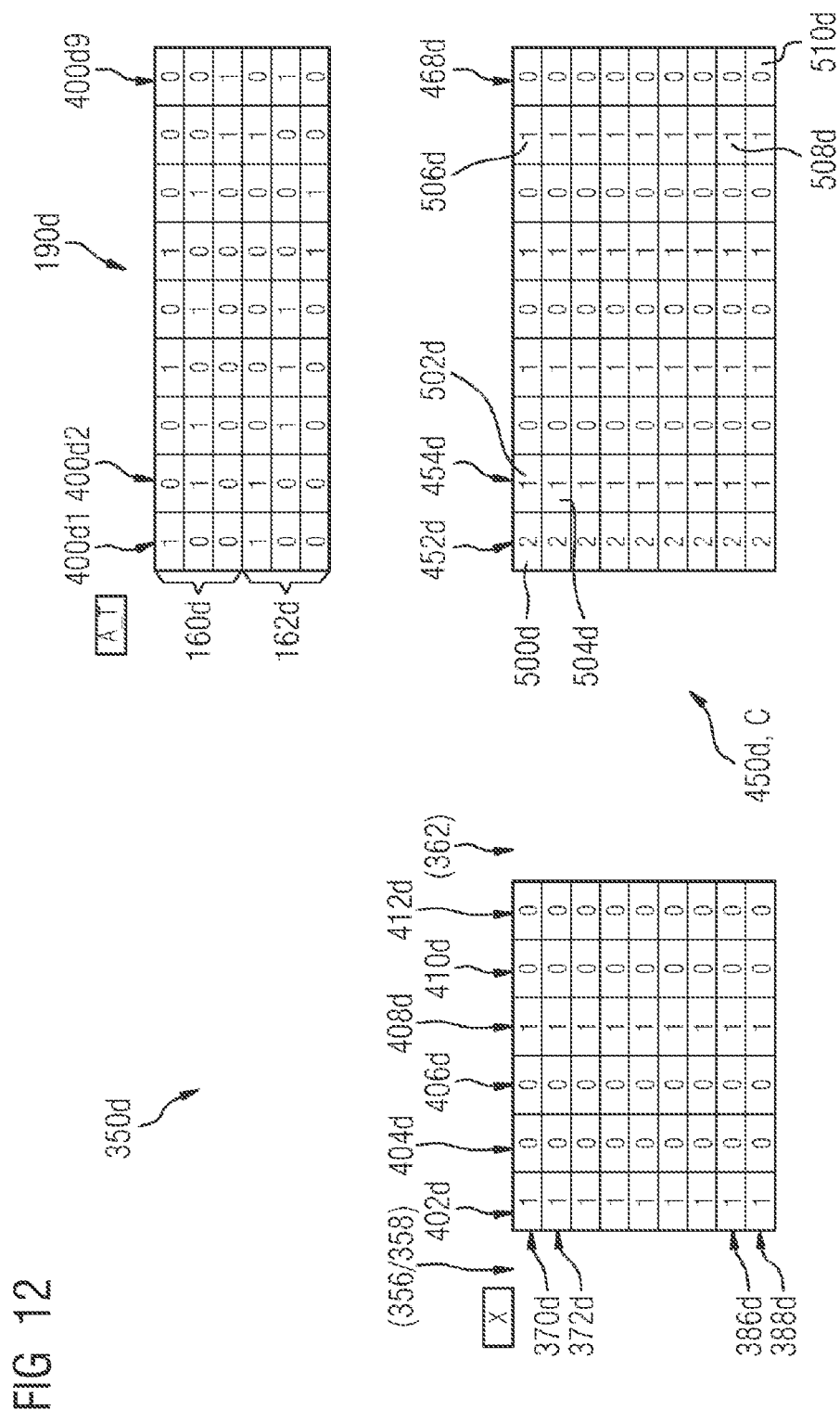
FIG. 12 shows a first example of the matrix multiplication of a detail from the degradation matrix X and a detail from the dependency matrix A.

FIG. 12 shows a first example of the matrix multiplication for a detail 350d for the degradation matrix X and the detail 190d from the transposed dependency matrix A.

The detail 350d from the degradation matrix X relates to some of the columns 360, see FIG. 10, namely three columns 402d, 404d and 406d, which relate to the wheel actuator RL or 22, and three columns 408d, 410d and 412d, which relate to the wheel actuator RR or 20. The columns 356 and 358 have accordingly been omitted to improve clarity, but can likewise be included in the computation. The same applies for columns 362, which relate to the present value of the "driving" or APF program.

For the six columns 402d to 412d in the detail 350d, the following applies:
in the column 402d, all elements have the value "1", i.e. degradation level Deg0 obtains for the wheel actuator 22, RL,
in the column 404d, all elements have the value "0",
in the column 406d, all elements have the value "0",
in the column 408d, all elements have the value "1", i.e. degradation level Deg0 obtains for the wheel actuator 20, RR,
in the column 410d, all elements have the value "0",
in the column 412d, all elements have the value "0".

The detail 190d tallies with the detail 190 apart from the interchange of the columns and rows, see FIG. 6. To improve clarity, FIG. 12 shows transposed rows 160d and 162d corresponding to the columns 160c and 162c, said rows being limited to the detail 190d, however.

Nine columns 400d1 to 400d in the detail 190d are associated with the degradation levels 10, 7, 6, 7, 6, 5, 5, 5 and 5 in this order and assigned the values of the relevant transposed elements.

The matrix multiplication involves the first element in the first row in the detail 350*d* being multiplied by the first element in the first column 400*d*1 in the detail 190*d* in a known manner. This then has the product of the second element in the first row in the detail 350*d* and the second element in the first column 400*d*1 in the detail 190*d* added to it, etc., for all elements in the first row in the detail 350*d* and the column 400*d*1. The other elements of the product matrix 450*d* or C are then computed in a similar manner, see also formula (3).

For the nine columns 452*d* to 468*d* of the product matrix 450*d*, C, the following applies:
  in the first column 452*d*, all elements have the value "2", for example see first element 500*d* on the main diagonal of the product matrix 450*d*, C,
  in the second column 454*d*, all elements have the value "1", for example see first element 502*d* and second element 504*d* on the main diagonal of the product matrix 450*d*, C,
  in the third column, all elements have the value "0",
  in the fourth column, all elements have the value "1",
  in the fifth column, all elements have the value "0",
  in the sixth column, all elements have the value "1",
  in the seventh column, all elements have the value "0",
  in the eighth column, all elements have the value "1", for example see first element 506*d* and penultimate element 508*d* on the main diagonal,
  in the ninth column 468*d*, all elements have the value "0", for example see last element 510*d* on the main diagonal.

Hence, by way of example, the elements on the main diagonal can be evaluated using the function explained below with reference to FIG. 14. Alternatively, the main diagonal elements are queried and the maximum is determined, which, in the example, is the element 500*d* in the first column in the detail 450*d*, C. The value of this element is "2", which tallies with the number of units taken into account in the detail 350*d*. Alternatively, it is also possible for the elements in a row of the product matrix 450*d*, C to be evaluated, for example the elements in the first row. The element 500*d* with the maximum provides a direct indication of the applicable performance level by means of its column number. In the example, no degradation occurred, which means that performance level 9 obtains, which is also associated with the first row of the degradation matrix X or with the first column of the dependency matrix A.

When the complete matrices are used for multiplication, the values in the product matrix 450*d* or C increase accordingly, with the maximum values then corresponding to the number of units in the application (i), in this case e.g. 4, for example see FIG. 4. The function explained below with reference to FIG. 14 for further computation is then also geared to this maximum number, see also formula (8).

Figure 13:
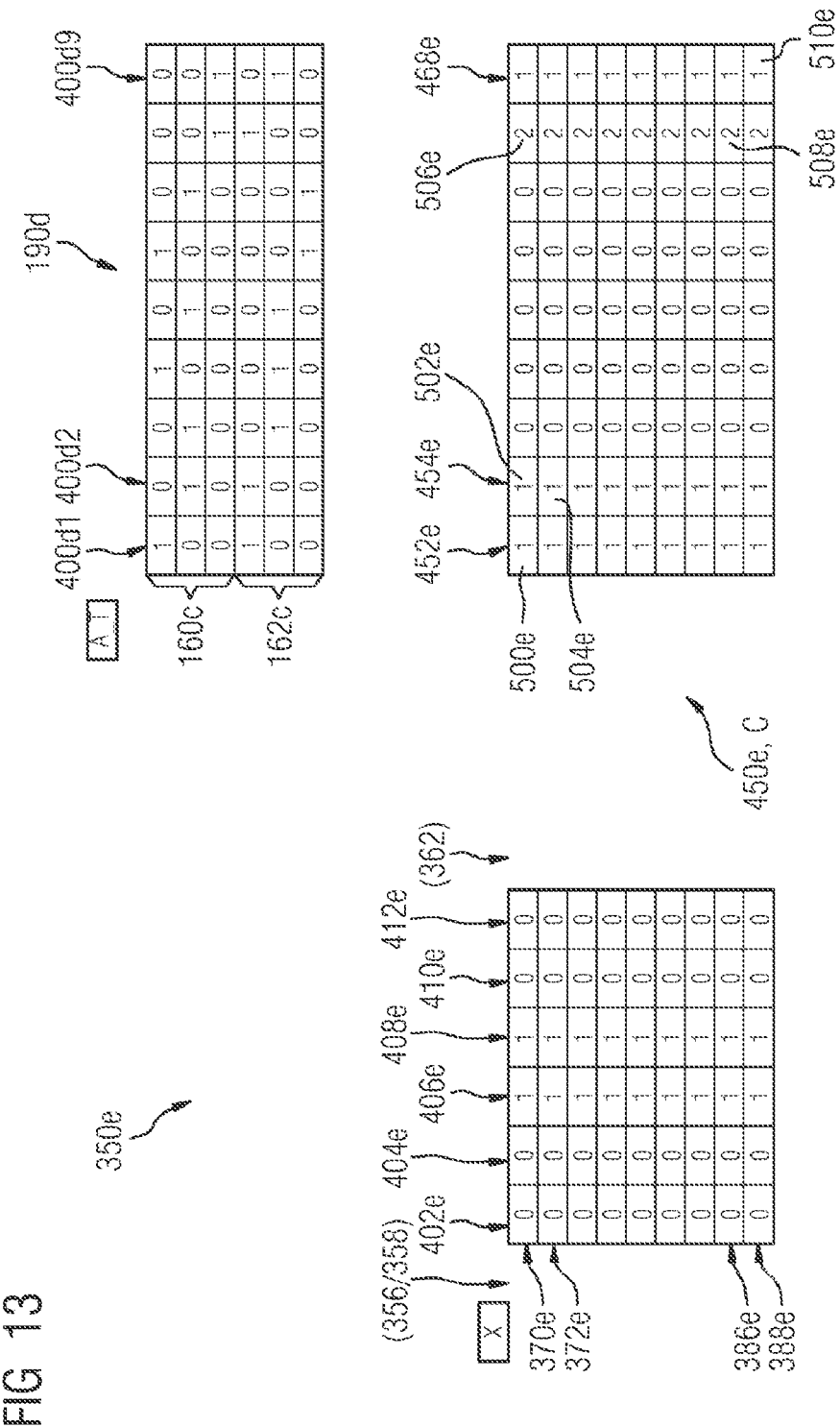
FIG. 13 shows a second example of the matrix multiplication of a detail from the degradation matrix X and a detail form the dependency matrix A.

FIG. 13 shows a second example of the matrix multiplication of a detail 350*e* from the degradation matrix X and the detail 190*d* from the dependency matrix A. Apart from the differences explained below, the statements relating to FIG. 12 continue to apply accordingly.

The detail 350*e* from the degradation matrix X again relates to some of the columns 360, see FIG. 10, namely three columns 402*e*, 404*e* and 406*e*, which relate to the wheel actuator RL or 22, and three columns 408*e*, 410*e* and 412*e*, which relate to the wheel actuator RR or 20. The columns 356 and 358 have accordingly been omitted to improve clarity, but can likewise be included in the computation. The same applies for columns 362, which relate to the present value of the "driving" or APF program. For the six columns 402*e* to 412*e* in the detail 350*e*, the following applies:
  in the column 402*e*, all elements have the value "0",
  in the column 404*e*, all elements have the value "0",
  in the column 406*e*, all elements have the value "1", i.e. degradation level DegN obtains for the wheel actuator 22, RL,
  in the column 408*d*, all elements have the value "1", i.e. degradation level Deg0 obtains for the wheel actuator 20, RR,
  in the column 410*d*, all elements have the value "0",
  in the column 412*d*, all elements have the value "0".

The detail 190*d* tallies with the detail 190 apart from the interchange of the columns and rows, see FIG. 6. To improve clarity, FIG. 13 shows transposed rows 160*d* and 162*d* corresponding to the columns 160*c* and 162*c*, said rows being limited to the detail 190*d*, however.

For the nine columns 452*e* to 468*e* in the product matrix 450*e*, C, the following applies according to the matrix multiplication explained above:
  in the first column 452*e*, all elements have the value "1", for example see first element 500*e* on the main diagonal of the product matrix 450*e*, C,
  in the second column 454*d*, all elements have the value "1", for example see first element 502*e* and second element 504*e* on the main diagonal of the product matrix 450*e*, C,
  in the third column, all elements have the value "0",
  in the fourth column, all elements have the value "0",
  in the fifth column, all elements have the value "0",
  in the sixth column, all elements have the value "0",
  in the seventh column, all elements have the value "0",
  in the eighth column, all elements have the value "2", for example see first element 506*e* and penultimate element 508*e* on the main diagonal,
  in the ninth column 468*d*, all elements have the value "1", for example see last element 510*e* on the main diagonal.

Hence, the elements from the main diagonal can again be evaluated, for example, using the function explained below with reference to FIG. 14. Alternatively, the main diagonal elements are queried and the maximum is determined, which, in the example in FIG. 13, is the element 508*e* in the penultimate or in the eighth column in the detail 450*e*, C. The value of this element is "2", again tallying with the number of units taken into account in the detail 350*e*. Alternatively, the elements in a row of the product matrix 450*e*, C can also be evaluated, for example the elements in the first row. The element having the maximum provides a direct indication in both cases to the applicable performance level by means of its column number. In the example in FIG. 13, a degradation DegN occurred on the wheel actuator RR so that performance level 5 obtains, which is also associated with the penultimate row in the detail 350*e* of the degradation matrix X or with the penultimate or the eighth column in the detail 190*d* of the dependency matrix.

When the complete matrices X and A (transposed) are used for multiplication, the values in the product matrix 450*e* or C increase accordingly, with the maximum values then corresponding to the number of units in the application (i), in this case e.g. 4, for example see FIG. 4. The function explained below with reference to FIG. 14 for further computation is then also geared to this maximum number, see also formula (8).

Figure 14:
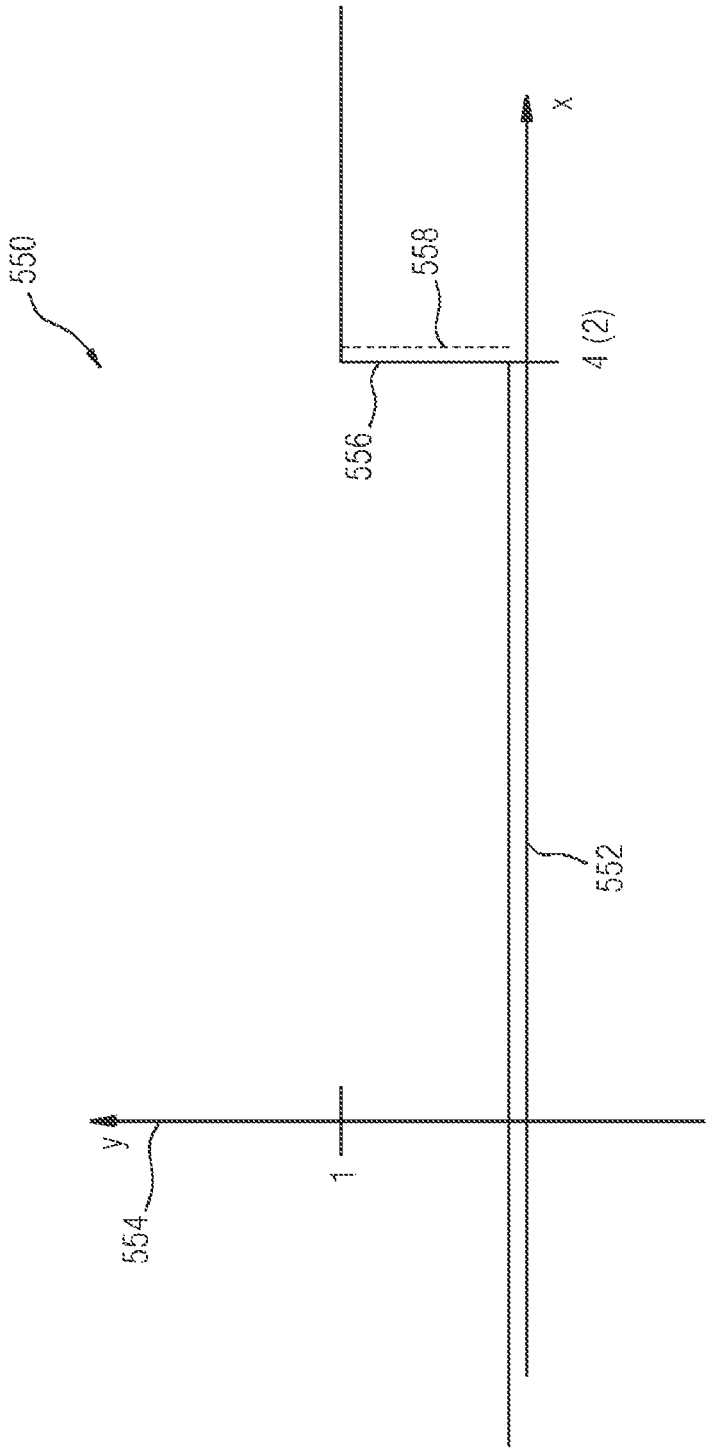
FIG. 14 shows a function to simplify the elements of the product matrix C.

FIG. 14 shows a function to simplify the elements of the product matrix C when four units are taken into account. A Cartesian coordinate system 550 contains an x axis 552 and a y axis 554 at right angles thereto. A function 556 has the following profile:

function value 0 for all x values less than 4,
function value 1 for the x value 4 and for larger x values, function values greater than 4 possibly not arising in the computations, however.

For an alternative function 558, the following applies:
function value 0 for all x values less than 4,
function value 1 for the x value 4.

If only two units are taken into account, for example, see FIGS. 12 and 13, then the function is modified accordingly, i.e.:

function value 0 for all x values less than 2,
function value 1 for the x value 2 and for x values greater than 2.

The function 558 tallies with the formula (8). By way of example, only integral x values can be used.

FIG. 15 shows a table 560 that shows the principle of ascertainment of the performance level of a cluster comprising multiple applications.

By way of example, the stipulations from table 8, cited in the introduction, for the performance levels of a particular cluster of applications apply.

The table 560 makes these stipulations clearer. The table 560 contains columns 562 to 570 having the following content:

the column 562 shows decimal values for the cluster performance levels in descending order beginning with 10 through to the value 0,
the column 564 shows a verbal indication of a performance level in the respective row 580 to 600 beginning with GREEN through YELLOW1 to YELLOW9 to RED,
the column 566 relates to the performance level PL of the most important application (i) or applications (i) in the cluster, where i is a natural number,
the column 568 relates to the performance level PL of the second most important application (i) or applications (i) in the cluster, and
the column 570 relates to the performance level PL of less important application (i) or applications (i) in the cluster.

The table 560 contains rows 580 to 600 having the following content:

The row 580 relates to the cluster performance level for the value 10, i.e. GREEN, wherein the columns 566, 568 and 570 have the associated content "GREEN", "GREEN" and "GREEN", i.e. the most important application(s), the second most important application(s) and the less important applications must each have the performance level "GREEN".

The row 582 relates to the cluster performance level with the value 9, i.e. YELLOW1, wherein only the column 570 has the content "YELLOW3,4", i.e. the less important applications have the performance level YELLOW3 or YELLOW4.

For the rows 584 to 596, reference is made to the text presented in FIG. 15.

The row 598 relates to the cluster performance level with the value 1, i.e. YELLOW9, wherein the column 566 has the content "YELLOW9" and the column 568 has the content "RED", i.e. the most important application(s) has or have the performance level YELLOW9 or the second most important application(s) has or have the performance level "RED".

The row 600 relates to the cluster performance level with the value 0, i.e. RED, wherein only the column 566 has the content "RED", i.e. the most important application(s) has or have the performance level RED.

Arrows 602, 604 indicate the systematics on which the table 560 is based, according to which the performance level of the clusters decreases all the more the greater the importance of the application, which has a particular single performance level, for example see the arrow 602 for the single performance level YELLOW6 extending via the rows 588, 590 and 592 and the arrow 604 for the single performance level RED extending via the rows 596, 598 and 600.

The method from table 8 or from FIG. 15 can result in various performance levels being able to be computed for the cluster performance value. It is then necessary to select the smallest, i.e. the worst (WORST function).

In other exemplary embodiments, other stipulations can be used for the cluster performance levels. Thus, by way of example, reference can be made only to the most important application(s) and to the second most important application(s), and/or more or fewer or other cluster performance levels and/or more or fewer or other single performance levels are used. The queries based on table 8 and based on table 560 can be performed using standard programs or in another manner.

Figure 16:
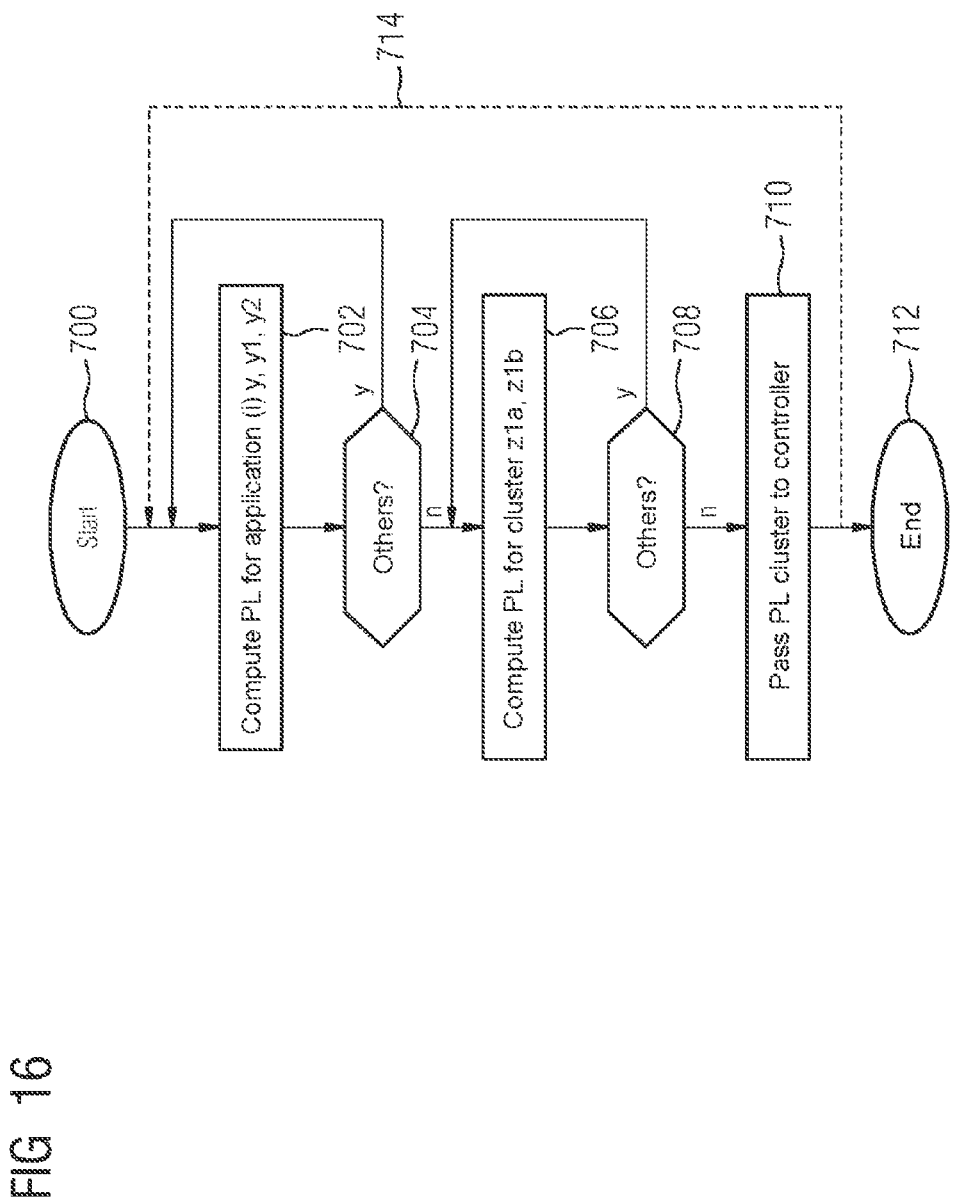
FIG. 16 shows method steps for the performance of a method for ascertaining the effectiveness of function clusters.

FIG. 16 shows method steps 700 to 712 for the performance of a method for ascertaining the effectiveness of function clusters. The method begins in a method step 700. The method steps are also referred to as a step below for short.

The step 700 is followed by a step 702 in which a single performance level a, y1, y2 is ascertained for an application (i) comprising multiple units/network nodes, as has been explained above with reference to FIGS. 1 to 14. In this case, it is possible for the formulae (1) to (9) to be used.

A step 704 that follows the step 702 is used to check whether there are still further applications for which a single performance level is to be computed. If this is the case, then the step 704 is immediately followed by the step 702, with i being increased by the value 1.

If, by contrast, the single performance levels have been computed for all applications (i), then the step 704 is followed by a step 706. The step 706 is used to ascertain the performance level z1a, z1b, possibly also z2a, z2b, etc., for a cluster comprising multiple applications, for example as has been explained above with reference to table 8 and FIG. 15. In another exemplary embodiment, however, it is possible to work without clustering. In this case, the total performance values y1, y2, etc., are used directly for selecting master/slave.

A step 708 that follows the step 706 is used to check whether there are still further clusters for which a cluster performance level is to be computed. If this is the case, then the step 708 is immediately followed by the step 706, with a count for indicating the cluster being increased by the value 1.

If, by contrast, the cluster performance levels have been computed for all clusters, then the step 708 is followed by a step 710. The step 710 is used to pass the cluster performance levels for at least two reciprocally redundant clusters to a controller that decides, by way of example, which cluster is meant to be the master cluster at that moment, that is to say the cluster that governs operation of a means of transport. There may also be multiple pairs or multiple groups of respectively reciprocally redundant clusters. Both with clustering and with no clustering, the controller may also be implemented in any channel 18, 18b, for example. Furthermore, the steps 708 and 706, for example, are dispensed with when no clustering is performed.

Subsequently, the method can be terminated in a step 712. In an exemplary embodiment, the method is repeated cyclically, so that the step 710 is again followed by the step 702, see arrow 714. The cycle time is less than 50 milliseconds, for example.

The exemplary embodiments are not to scale and not restrictive. Modifications within the scope of action of a person skilled in the art are possible. Although the invention has been illustrated and described in more detail by the preferred exemplary embodiment, the invention is not restricted by the disclosed examples, and other variations can be derived therefrom by a person skilled in the art without departing from the scope of protection of the invention. The developments and refinements cited in the introduction can be combined with one another. The exemplary embodiments cited in the description of the figures can likewise be combined with one another. Moreover, the developments and refinements cited in the introduction can be combined with the exemplary embodiments cited in the description of the figures.

What is claimed is:

1. A method for selecting multiple program functions for providing multiple instances of an implemented function, thereby providing a redundantly implemented function, in a vehicle, a ship, or an aircraft, the method comprising:
    defining a plurality of functional units, each functional unit comprising a network node or an actuator configured to implement a function in the vehicle, ship, or aircraft,
    recording first dependencies between single performance values for first functional units used for performing a first program function and total performance values stipulated for redundantly implemented functions, the first program function defining a relationship between sensor data and
    recording second dependencies between single performance values for second functional units used for performing a second program function and the stipulated total performance values,
    receiving first sensor data, via at least one first communication link, from at least one first sensor associated with the first functional units of the first program function,
    receiving second sensor data, via at least one second communication link, from at least one second sensor associated with the second functional units of the second program function,
    determining current first single performance values of the functional units of the first program function based on the received first sensor data,
    determining current second single performance values of the functional units of the second program function based on the received second sensor data,
    determining a first total performance value based on the determined first single performance values and the recorded first dependencies,
    determining a second total performance value based on the determined second single performance values and the recorded second dependencies,
    determining a cluster performance value based on the first total performance value and the second total performance value,
    selecting either the program functions or other program functions for providing the redundantly implemented functions based on the cluster performance value or at least one value determined from the cluster performance value.

2. The method of claim 1, comprising:
    recording the dependencies in a matrix,
    wherein either:
        the rows of the matrix are associated with the total performance values and the columns of the matrix are associated with the single performance values, or
        the columns of the matrix are associated with the total performance values and the rows of the matrix are associated with the single performance values,
    wherein the matrix contains only two different values,
    wherein at least two rows of the matrix or at least two columns of the matrix are provided for at least one total performance value to represent OR functions and/or to utilize states of functional units associated with the respective total performance value.

3. The method of claim 2, comprising:
    recording the current single performance values in a further matrix or in a vector, wherein the further matrix or the vector contains only two different values, and
    determining the total performance value by multiplying the matrix and the further matrix or by multiplying the matrix and the vector.

4. The method of claim 3, comprising determining the total performance value using a computation function that is:
    (a) defined for values less than or not equal to the number of functional units to form a first value, and
    (b) defined for a value equal to this number to form a second value that differs from the first value.

5. The method of claim 4, comprising:
    determining the total performance value using a vector in which the total performance values are recorded based on the recorded dependencies,
    multiplying the vector and a vector or a matrix determined using the computation function, and
    performing the method is cyclically, with a cycle time of less than 50 milliseconds.

6. The method of claim 1, wherein:
    multiple classes of functional units are stipulated, which functional units have single performance values with a class-specific significance, and
    at least two functional units of the function belong to the same class or to different classes,
    the classes are stipulated based on one, two, or all three of the following redundancy features:
        no redundancy for a functional unit or redundancy by virtue of redundantly provided functional units,
        no value redundancy or value redundancy with respect to a functional unit, or
        no communication link redundancy or multiple communication link redundancy.

7. The method of claim 1, wherein the total performance values are stipulated for at least two of the functional units based on a determined negative effect or negative effects of an error, the negative effect or effects relating to at least on of:
    a negative impact on passengers and/or freight,
    a shortfall below a service assignment or a service interval, or
    a termination of a journey or a driving assignment or a flight.

8. The method of claim 1, comprising recording the current single performance values in a matrix or vector that contains only two different values.

9. The method of claim 1, wherein:
at least one functional unit is a network node or the program function itself, and
the following functions are provided:
   a function for driving including at least one of the following functional units:
      a function relating to an accelerator pedal,
      at least one relating to a wheel and a drive motor, or
      a program relating to driving,
   (b) a function for braking including at least one of the following functional units:
      a unit for reading a driver braking requirement at a brake pedal,
      a unit for actuating brake hydraulics,
      at least two electrically driven wheels usable for braking, or
      a program function configured to convert a brake command required by the driver into a setpoint braking specification for the wheel, usable by the network node for actuating the hydraulic brake,
   (c) a function for steering including at least one of the following functional units:
      actuation of a steering controller and output of the actual steering position,
      evaluation of the setpoint steering angle at the steering wheel, or
      a program function controller specification=f (actual steering angle, setpoint steering angle), and
   (d) a function for an ABS assistance function, an ESP assistance function, or a fully automatic driving assistance function.

10. The method of claim 1, wherein:
cluster performance values are stipulated for at least two of the functions in equal measure,
at least one of the following classes are taken into account:
   a determined most important function or functions, a determined second most important function or functions, or a determined less important function or functions.

11. The method of claim 10, comprising determining a cluster performance value for multiple functions of a cluster using IF THEN queries or using CASE queries.

12. A method for selecting between multiple available program function for providing multiple instances of an implemented function, thereby providing a redundantly implemented function, in a vehicle, a ship, or an aircraft, the method comprising:
for each program function, recording, in a matrix, dependencies between single performance values for functional units used for performing the respective program function and total performance values been stipulated for a redundantly implemented function, each functional unit comprising a network node or an actuator configured to implement a function in the vehicle, ship, or aircraft,
wherein for each respective matrix:
   the rows of the matrix are associated with the total performance values and the columns of the matrix are associated with the single performance values, or
   the columns of the matrix are associated with the total performance values and the rows of the matrix are associated with the single performance values,
   the matrix contains two different values, and
   at least two rows of the matrix or at least two columns of the matrix are provided for at least one total performance value to represent OR functions and/or to utilize states of functional units associated with the respective total performance value,
receiving sensor data, via at least one first communication link, from at least one first sensor associated with the functional units,
determining current single performance values of the functional units based on the received sensor data,
determining a total performance value for the functional units based on the determined single performance values and the recorded dependencies,
selecting between the multiple program function for providing the redundantly implemented function based on the total performance value or at least one value determined from the total performance value.

13. An apparatus for selecting at least one program function for providing a redundantly implemented function in a vehicle, a ship, or an aircraft, the apparatus comprising:
a memory unit storing:
   recorded first dependencies between single performance values for first functional units used for performing a first program function and total performance values been stipulated for redundantly implemented functions, and
   recorded second dependencies between single performance values for second functional units used for performing a second program function and the stipulated total performance values,
   wherein each first functional unit and each second functional unit comprises a network node or an actuator configured to implement a respective function in the vehicle, ship, or aircraft,
a first ascertainment unit that configured to:
   receive sensor data, via at least one first communication link, from at least one sensor associated with the first functional units of the first program function,
   determine current first single performance values of the functional units of the first program function based on the received sensor data, and
   determine current second single performance values of the functional units of the second program function,
a second ascertainment unit configured to:
   determine a first total performance value based on the determined first single performance values and the recorded first dependencies, and
   determine a second total performance value based on the ascertained second single performance values and the recorded second dependencies,
a third ascertainment unit configured to determine a cluster performance value based on the first total performance value and from the second total performance value,
wherein cluster performance values are stipulated for at least two of the functions in equal measure, wherein at least one of the following classes are taken into account:
   a determined most important function or functions,
   a determined second most important function or functions, or
   a determined less important function or functions, and
a selection unit configured to select either the first program function and the second program function or other program functions for providing the redundantly implemented functions based on the cluster performance value or at least one value determined from the cluster performance value.

14. An apparatus for selecting at least one program function for providing a redundantly implemented function in a vehicle, a ship, or an aircraft, the apparatus comprising:
   a memory unit storing:
      recorded dependencies between single performance values for functional units used for performing a program function and total performance values stipulated for a redundantly implemented function,
   wherein the total performance values are stipulated for at least two of the functional units based on a determined negative effect or negative effects of an error, the negative effect or effects relating to at least on of:
      a negative impact on passengers and/or freight,
      a shortfall below a service assignment or a service interval, or
      a termination of a journey or a driving assignment or a flight,
   a first ascertainment unit that:
      receives sensor data, via at least one first communication link, from at least one sensor associated with the functional units of the program function, and
      determines current single performance values of the functional units based on the received sensor data,
   a second ascertainment unit that determines a total performance value based on the determined single performance values and the recorded dependencies, and
   a selection unit that selects the program function or another program function for providing the redundantly implemented function based on the current total performance value or at least one value determined from the current total performance value.

* * * * *